US010768968B2

(12) United States Patent
Neiger et al.

(10) Patent No.: US 10,768,968 B2
(45) Date of Patent: Sep. 8, 2020

(54) SPLIT-CONTROL OF PAGE ATTRIBUTES BETWEEN VIRTUAL MACHINES AND A VIRTUAL MACHINE MONITOR

(71) Applicant: Intel Corporation, Santa Clara, CA (US)

(72) Inventors: Gilbert Neiger, Portland, OR (US); Geoffrey Strongin, Tigard, OR (US); Ramya Jayaram Masti, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 16/147,169

(22) Filed: Sep. 28, 2018

(65) Prior Publication Data
US 2019/0042299 A1  Feb. 7, 2019

(51) Int. Cl.
*G06F 12/10* (2016.01)
*G06F 9/455* (2018.01)
*G06F 12/1009* (2016.01)

(52) U.S. Cl.
CPC ...... *G06F 9/45558* (2013.01); *G06F 12/1009* (2013.01); *G06F 2009/45583* (2013.01); *G06F 2009/45587* (2013.01)

(58) Field of Classification Search
CPC .. G06F 9/45558; G06F 12/1009; G06F 12/10; G06F 12/1036; G06F 12/1475; G06F 12/1491; G06F 9/455
USPC .......................................................... 711/6
See application file for complete search history.

(56) References Cited

U.S. PATENT DOCUMENTS

| 8,245,227 B2 * | 8/2012 | Devine ............... G06F 12/1009 718/1 |
| 2008/0005447 A1 * | 1/2008 | Schoenberg .......... G06F 12/109 711/6 |
| 2010/0223447 A1 | 9/2010 | Serebrin |

(Continued)

FOREIGN PATENT DOCUMENTS

WO  2006/081582 A2   8/2006

OTHER PUBLICATIONS

F. Shaikh, F. Yao, I. Gupta and R. H. Campbell, "VMDedup: Memory De-duplication in Hypervisor," 2014 IEEE International Conference on Cloud Engineering, Boston, MA, 2014, pp. 379-384, doi: 10.1109/IC2E.2014.69.*

(Continued)

Primary Examiner — Pierre Miche Bataille
(74) Attorney, Agent, or Firm — Nicholson De Vos Webster & Elliott LLP

(57) ABSTRACT

A method includes receiving, by a processor from a virtual machine (VM) executed by the processor, an indication that a proper subset of a plurality of virtual memory pages of the VM are secure memory pages. The method further includes, responsive to determining the VM is attempting to access a first memory page, determining whether the proper subset comprises the first memory page. The method further includes, responsive to determining the proper subset comprises the first memory page: using first attributes specified by the VM for the first memory page; and ignoring second attributes specified by a virtual machine monitor (VMM) for the first memory page. The VMM is executed by the processor to manage the VM.

20 Claims, 13 Drawing Sheets

(56) References Cited

U.S. PATENT DOCUMENTS

| | | | | |
|---|---|---|---|---|
| 2013/0132690 A1* | 5/2013 | Epstein | ............... | G06F 12/1416 |
| | | | | 711/159 |
| 2016/0210069 A1* | 7/2016 | Lutas | ................... | G06F 3/0664 |
| 2017/0046185 A1* | 2/2017 | Tsirkin | ................ | G06F 9/45558 |
| 2018/0074969 A1* | 3/2018 | Neiger | ................ | G06F 12/1441 |
| 2019/0370044 A1* | 12/2019 | Tsirkin | ................ | G06F 9/45558 |

OTHER PUBLICATIONS

L. A. Garrido, R. Nishtala and P. Carpenter, "SmarTmem: Intelligent Management of Transcendent Memory in a Virtualized Server," 2019 IEEE International Parallel and Distributed Processing Symposium Workshops (IPDPSW), Rio de Janeiro, Brazil, 2019, pp. 911-920, doi: 10.1109/IPDPSW.2019.00151.*

Xu, Y., et al., "Controlled-Channel Attacks: Deterministic Side Channels for Untrusted Operating Systems", 2015 IEEE Symposium on Security and Privacy, IEEE Computer Society, copyright 2015, pp. 640-656.

Shinde, S., et al., "Preventing Your Faults from Telling Your Secrets: Defenses against Pigeonhole Attacks", National University of Singapore, arXiv:1506.04832v2 [cs.CR], Jan. 12, 2016, 16 pages.

Hahnel, M., et al., "High-Resolution Side Channels for Untrusted Operating Systems", USENIX ATC '17, https://www.usenix.org/conference/atc17/technical-sessions/presentation/hahnel, retrieved on Jul. 31, 2018, 2 pages.

European Search Report and Search Opinion, EP App. No. 19183084.3, dated Mar. 20, 2020, 10 pages.

\* cited by examiner

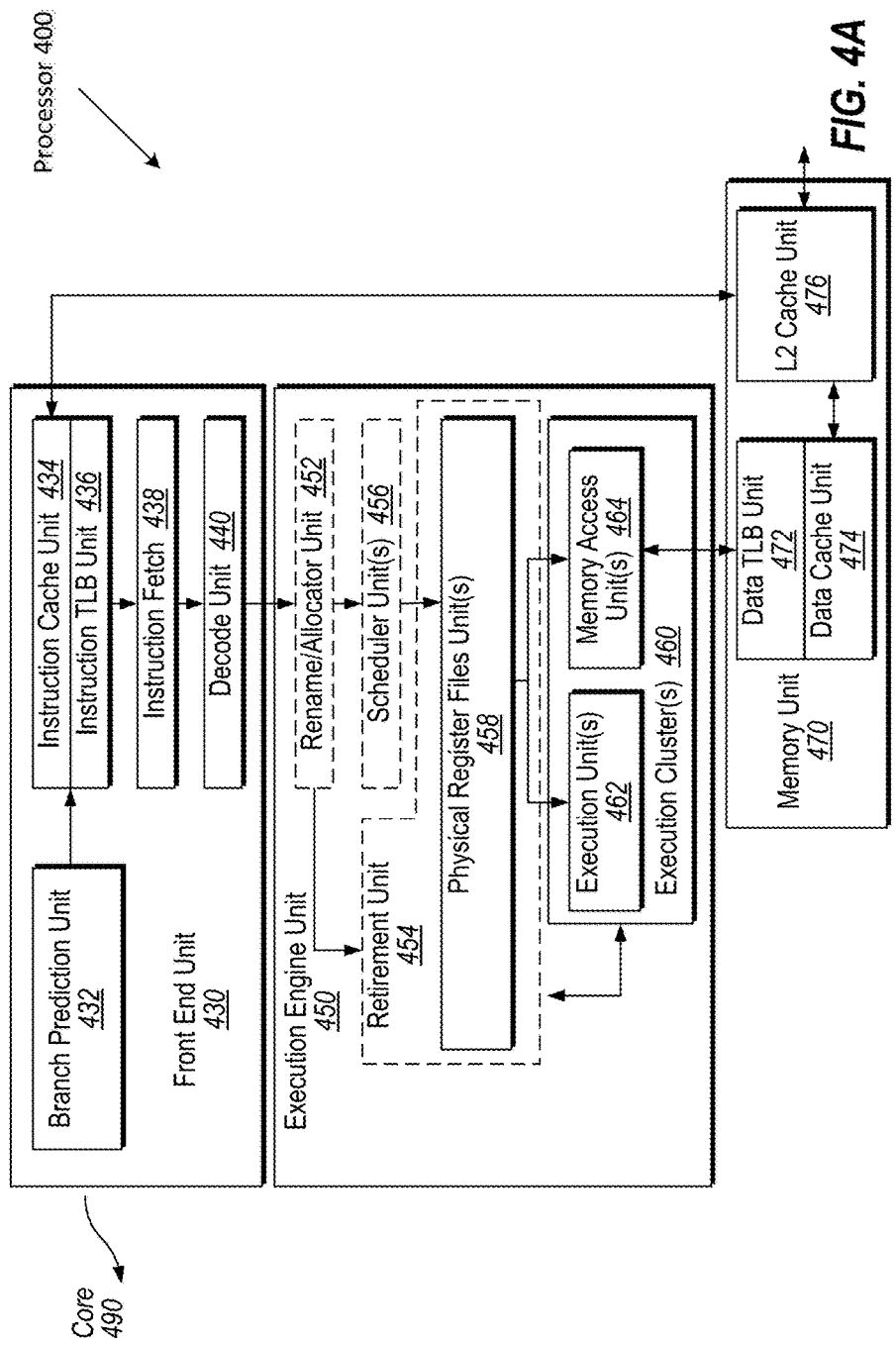
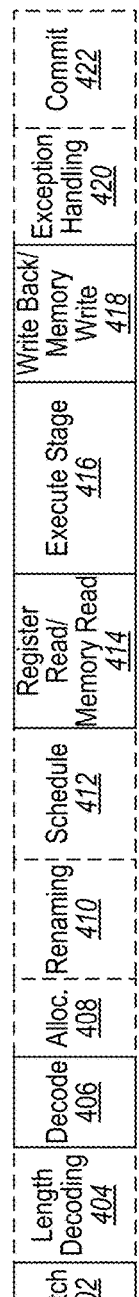

US 10,768,968 B2

SPLIT-CONTROL OF PAGE ATTRIBUTES BETWEEN VIRTUAL MACHINES AND A VIRTUAL MACHINE MONITOR

TECHNICAL FIELD

Embodiments of the disclosure relate generally to split control of page attributes between virtual machines and a virtual machine monitor.

BACKGROUND

Virtualization includes creating one or more guest machines based on a host machine. The host machine includes physical hardware of a computing system and each guest machine includes a respective virtual machine (VM). A VM is an emulation of the computer system and provides functionalities of the physical hardware. A virtual machine monitor (VMM) (e.g., hypervisor) creates VMs based on the physical hardware and manages the VMs. In managing VMs, a VMM may have the ability to access or modify memory of the VMs.

BRIEF DESCRIPTION OF THE DRAWINGS

FIG. 4A is a block diagram illustrating a micro-architecture for a processor that splits control of page attributes between the VM and VMM, according to one embodiment.

FIG. 4B is a block diagram illustrating an in-order pipeline and a register renaming stage, out-of-order issue/execution pipeline according to an embodiment of the disclosure.

DESCRIPTION OF THE EMBODIMENTS

Figure 1:
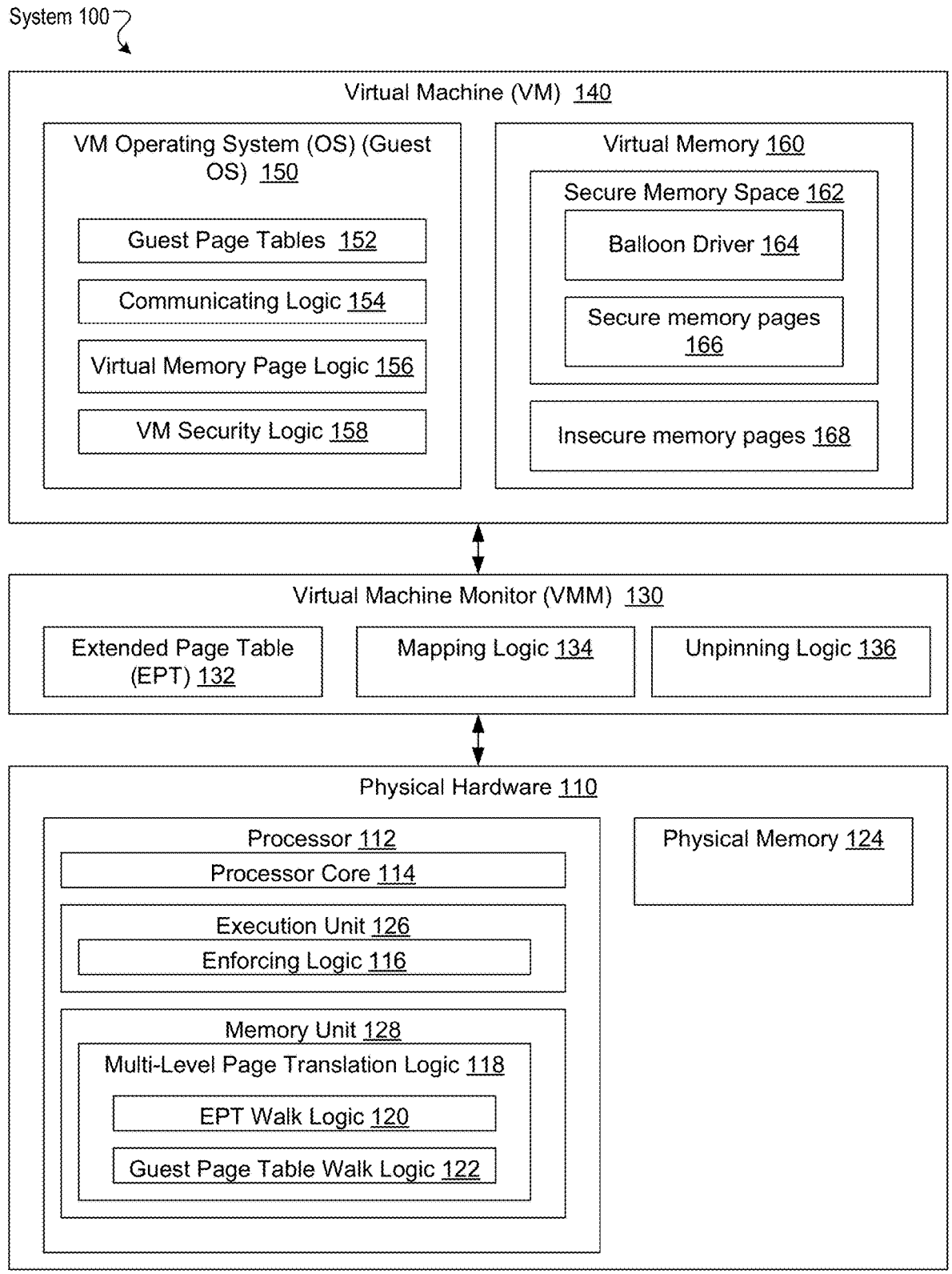
FIG. 1 illustrates a system including physical hardware, a VMM, and a VM, according to certain embodiments.

Described herein are technologies directed to split-control of page attributes between virtual machines (VMs) and a virtual machine monitor (VMM). Physical hardware of a host machine may include a processor that executes one or more VMs (e.g., guest machines) and a VMM (e.g., hypervisor). The VMM may create and manage the VMs. The VMM may allocate more memory to VMs than what is available in the physical hardware (e.g., oversubscribe by dynamically moving memory between VMs). Virtual memory of a VM includes virtual memory pages that each correspond to a respective physical page of the physical memory of the physical hardware. Page tables are used to translate a virtual memory address of a virtual memory page to a physical memory address of a physical page. Page tables are also used to control attributes of virtual memory pages, such as the ability to read (R) a virtual memory page, the ability to write (W) to a virtual memory page, and the ability to execute (X) a virtual memory page (RWX attributes), and cache attributes (e.g., cacheable, non-cacheable, etc.). Attributes of each virtual memory page of a VM (e.g., RWX attributes, cache attributes) are controlled by multi-level page tables. Multi-level page tables include guest page tables (guest OS tables) of the VM and extended page table (EPT) of the VMM.

A host (e.g., an on-demand cloud computing platform) may provide the physical hardware, VMM, and VMs and may allow users to subscribe to use individual VMs. A VMM (e.g., a malicious VMM, a compromised VMM) may be able to access or modify memory of the VMs. A VM (e.g., having a malicious or compromised guest OS) may prevent a VMM from reclaiming memory (e.g., prevent the VMM from oversubscribing). Therefore, there may exist a mutual distrust between VMs and the underlying VMM (e.g., in a public cloud setting).

Conventional memory isolation between the VMM and the VM allows the VMM to control page attributes (e.g., RWX attributes, cache attributes) of the virtual memory pages. However, a problem with such conventional memory isolation is that a malicious or compromised VMM may manipulate page attributes of virtual memory pages to launch attacks. For instance, a VMM may change a page attribute (e.g., a RWX attribute of a virtual memory page) to be different from what is specified by the VM and cause a fault each time the VM attempts to access a page. The VMM could then track the faults and determine the sequence used by the VM (e.g., perform page-based fault injection attacks to leak execution trace and secrets (e.g., sequence of operations) of the VM). For example, responsive to a VM marking a page as writeable and a VMM maliciously marking the page as unwriteable (e.g., toggling the write bit), a fault may occur every time the VM tries to write to the page. Based on the faults, the VMM can thereby track the sequence of writes performed by the VM. Furthermore, a VMM operating using the conventional memory isolation techniques may change the cache attributes of a virtual memory page to an unexpected value, and thus the VMM can violate or interfere with semantics of VM applications that depend on cache attributes. For example, if a VM application uses un-cached memory for security-sensitive computation to prevent cache side-channel attacks, an untrusted VMM can violate the assumption by changing the cache attributes of the page.

The devices, systems, and methods, as described herein provide split-control of page attributes between VMs and a VMM. A processor may receive, from a VM executed by the processor, an indication of which virtual memory pages of the VM are secure memory pages. The VM may attempt to access a first virtual memory page and the processor may determine whether the first memory page is a secure memory page. Responsive to determining the first virtual memory page is a secure memory page, the processor may use first attributes specified by the VM (e.g., in a guest page table) for the first memory page and ignore second attributes specified by the VMM (e.g., in the EPT) for the first memory page. Responsive to determining the first memory page is not a secure memory page, the processor may use the second attributes specified by the VMM (e.g., in the EPT) for the first memory page. The processor may perform this process for every virtual memory page that the VM attempts to access. Therefore, the VMM retains control over certain memory management functions without being able to manipulate page attributes of secure memory pages. The VMM is thereby prevented from performing attacks such as page-based fault injection attacks to leak execution trace and secrets of the VM, cache side-channel attacks, etc. for secure memory pages.

FIG. 1 illustrates a system 100 including physical hardware 110, a VMM 130, and one or more VMs 140, according to certain embodiments. A host machine may include the physical hardware 110 and a guest machine may include the VM 140. Although FIG. 1 only displays one VM 140, system 100 may include multiple VMs 140 that are managed by the same VMM 130 and execute on the same physical hardware 110.

The physical hardware 110 may include a processor 112 and physical memory 124 that is communicably coupled to the processor 112. In one embodiment, processor 112 and physical memory 124 are fabricated on a system-on-a-chip (SoC). The physical memory 124 may store system application programs and user application programs, and the data associated with these programs. The processor 112 may execute tasks such as system applications and user applications using the physical memory 124 to store the instructions of the programs and data associated with the programs.

In some embodiments, the processor 112 includes a logic circuit implemented to support execution of a set of virtualization instructions (e.g., virtual-machine extension (VMX)) to provide support for one or more virtualization environments ported on the physical hardware 110. The VMX may provide processor-level support for one or more VMs 140. In one embodiment, the VMX includes instructions to support a VMM 130 that is a host program that allows one or more execution environments (e.g., VMs 140) to run on the physical hardware 110. VMM 130 may create and run one or more VMs 140. Processor core 114 may execute the VMM 130 (that includes an EPT 132) and one or more VMs 140 (that include guest page tables 152).

The processor 112 may include one or more processor cores 114, execution unit 126 (e.g., execution circuitry), and a memory unit 128 (memory circuitry). Execution unit 126 may include enforcing logic 116. Memory unit 128 may include multi-level page translation logic 118. Processor cores 114 are logic circuits within the processor 102 for executing certain tasks (e.g., software applications). The execution unit 126, memory unit 128, enforcing logic 116, and multi-level page translation logic 118 may be logic circuits within the processor 102 for executing certain tasks. In some embodiments, the execution unit 126, memory unit 128, enforcing logic 116, and the multi-level page translation logic 118 are logic circuits within the processor core 114. The memory unit 128 may include the EPT walk logic 120 and guest page table walk logic 122 of the multilevel page translation logic 118. The execution unit 126 may include the enforcing logic 116. In some embodiments, the enforcing logic 116 and multi-level page translation logic 118 are implemented by one or more of software running on the processor 112, firmware of the processor 112, or hardware (e.g., circuitry) within the processor 112.

In some embodiments, the processor 112 includes a memory unit and an execution unit coupled to the memory unit. The memory unit may determine first attributes specified by a VM for a first memory page (the VM executed by the processor) and may determine second attributes specified by a VMM for the first memory page (the VMM executed by the processor to manage the VM). The execution unit may receive, from the VM, an indication that a proper subset of a plurality of virtual memory pages of the VM are secure memory pages and, responsive to determining the VM is attempting to access the first memory page, determine whether the proper subset includes the first memory page. Responsive to determining the proper subset includes the first memory page, the processor 112 (e.g., processor core 114) may use first attributes specified by the VM for the first memory page and ignore second attributes specified by the VMM for the first memory page. The plurality of virtual memory pages is a set of virtual pages and the proper subset is less than the set of virtual pages (e.g., the proper subset is associated with a number of virtual pages that is less than the total number of virtual pages in the set).

In one embodiment, tasks executed on a processor core 114 do not access the physical memory 124 directly using the physical address of the physical memory 124. Instead, the tasks access virtual memory 160 of the VM 140 through virtual addresses (e.g., linear addresses). The virtual addresses (of virtual memory pages) of the virtual memory 160 may be mapped (e.g., by mapping logic 134 of the VMM 130) to the physical addresses (of physical memory pages) of the physical memory 124. The virtual memory 160 of a VM 140 may be divided into fixed sized units called virtual memory pages that each has a corresponding virtual address. The physical memory 124 may be organized according to physical memory pages (e.g., memory frames) that each has a fixed size. Each one of the physical memory pages may be associated with an identifier that uniquely identifies the physical memory page. A virtual memory page of the virtual address may be mapped corresponding to a fixed-sized unit in the physical address space of the physical memory 124 (e.g., a memory frame, a physical memory page). During execution of a guest application (e.g., on VM 140), responsive to a request to access physical memory 124, the processor 112 (e.g., processor core 114) may use mappings (e.g., mappings of virtual memory page to physical memory page in page tables such as guest page tables 152 of the VM 140 and EPT 132 of the VMM 130) to access physical memory pages of physical memory 124.

The processor 112 may provide a virtualization environment that uses multi-level paging (e.g., via multi-level page translation logic 118) in which the last level translation is controlled by the VMM 130. The multi-level page translation logic 118 of the processor 112 may include EPT walk logic 120 and guest page table walk logic 122 (e.g., guest OS table walk logic). The EPT walk logic 120 and the guest page table walk logic 122 may be logic circuits in the processor 112. The multi-level page translation logic 118 may check the memory access rights (e.g., based on page attributes) during execution of guest applications to prevent certain types of memory accesses (e.g., those caused by stray accesses) that are not permitted by VMM 130 as specified in the EPT 132 and/or that are not permitted by the VM 140 as specified in the guest page tables 152.

In one embodiment, page attribute values stored in an entry of a page table (e.g., EPT 132, guest page tables 152) may include one or more status bits to indicate certain page access status that are to be checked before accessing physical memory pages mapped to an entry of the page table. For example, each of the page attribute values may be represented by one bit, where an access right is enabled when the bit value is one ("1") and the access right is disabled when the bit value is zero ("0"). Thus, R bit=1/0, indicating reads from pages are enabled/disabled; W bit=1/0, indicating writes to pages are enabled/disabled; X bit=1/0, indicating execution from pages in enabled/disabled.

The EPT walk logic 120 may walk the EPT 132 to determine (e.g., retrieve) a mapping, attributes, etc. stored in an entry of the EPT 132 and may store the mapping, attributes, etc. (e.g., in physical memory 124) for use by the enforcing logic 116. The guest page table walk logic 122 may walk the guest page tables 152 to determine (e.g., retrieve) a mapping, attributes, etc. stored in an entry of a guest page table 152 and may store the mapping, attributes, etc. (e.g., in physical memory 124) for use by the enforcing logic 116). The enforcing logic 116 may enforce use (e.g., by the processor core 114) of certain page attributes and may raise security exceptions (see FIGS. 3A-D). The enforcing logic 116 may use the certain page attributes.

The VMM 130 may include the EPT 132, mapping logic 134, and unpinning logic 136. Processor core 114 may execute VMM 130 to create (e.g., via mapping logic 134) a mapping (e.g., to be stored by the VMM 130 in an EPT 132) from the virtual memory 160 of the VM 140 to the physical memory 124. The mapping logic 134 of the VMM 130 may construct the EPT 132 using EPT entries that may each specify a mapping from an identifier of a virtual memory page to an identifier of a physical memory page. The EPT 132 of the VMM 130 is controlled by the VMM 130 and may be stored in physical memory 124. The unpinning logic 136 of the VMM 130 may unpin virtual memory pages (see FIG. 3D).

In some embodiments, a VM 140 may be corrupt or malicious (e.g., may prevent a VMM from reclaiming memory, etc.). A first policy data structure stored in the physical memory 124 may include rules that specify how to determine the access rights stored in the entries of the EPT 132 based on corresponding page attributes. Thus, the VMM 130 may specify access rights in an entry of the EPT 132 different from the access rights assigned to the corresponding guest page table 152 by the guest OS 150. In this way, VMM 130 may provide a further layer of protection to a physical memory page (e.g., insecure memory page 168) by modifying access rights stored in the entry of the EPT 132 based on rules.

In some embodiments, a VMM 130 may be corrupt or malicious (e.g., may access or modify memory pages of the virtual memory 160 of the VM 140 by modifying attributes of the corresponding memory pages via the EPT 132). A second policy data structure stored in the physical memory 124 may include rules that specify how to determine the access rights stored in the entries of the guest page tables 152 based on corresponding page attributes. Thus, the VM 140 may specify access rights in an entry of a guest page table 152 different from the access rights assigned to the EPT 132 by the VMM 130. In this way, VM 140 may provide a further layer of protection to a physical memory page (e.g., a secure memory page 166) by modifying access rights stored in the entry of the guest page tables 152 based on rules.

Each VM 140 may behave like a hardware computing device to end users. For example, each VM 140 may include a virtual processor (not shown) that emulates a hardware processor. Each VM 140 may include virtual memory 160 that is coupled to the corresponding virtual processor. The virtual processor associated with a VM 140 may support a respective guest OS 150 of the VM 140. Guest applications may run within environments of guest OS 150. Guest OS 150 (including kernels) can include a number of guest-OS components (or kernel components) to provide a number of services to guest applications. In one embodiment, the guest-OS provided services may include one or more of scheduler, process management, I/O management, memory management, drivers (e.g., file system and volume drivers, mass storage drivers, and bus drivers), or code integrity management services.

The guest OS 150 may include guest page tables 152 (e.g., guest OS tables), communicating logic 154, virtual memory page logic 156, and VM security logic 158. The virtual memory page logic 156 may assign a page attribute of a virtual memory page in the guest page table 152 of the VM 140. The guest page tables 152 may be stored in the physical memory 124.

A VM 140 including guest OS 150 and guest applications may access physical memory 124 through a series of memory space mappings that are stored in guest page tables 152. Guest OS 150 may construct virtual memory 160 that may be mapped to the physical memory 124 (e.g., a corresponding guest physical address space for a VM 140). Virtual memory 160 may be organized according to virtual memory pages that each has a fixed size. Each one of the virtual memory pages may be associated with an identifier that uniquely identifies a corresponding physical address of the physical memory 124 (e.g., of a physical memory page). The guest OS 150 may create guest page tables 152 that include the mappings.

The virtual memory 160 may include secure memory space 162 and insecure memory pages 168. The secure memory space 162 may include a balloon driver 164 and secure memory pages 166.

The virtual memory page logic 156 may classify virtual memory pages of the virtual memory 160 of the VM 140 as a secure memory page 166 (e.g., in the secure memory space 162, to create the secure memory space 162) or as an insecure memory page 168. A virtual memory page may be classified as a secure memory pages 166 based on a need for confidentiality, integrity, and replay protection (e.g., contains confidential code and/or data the VM 140 is to protect from the VMM 130) against a VMM 130 that is malicious and/or untrusted (e.g., a VMM 130 that is operated by an entity that is different than the entity that uses the VM 140). Insecure memory pages 168 may be considered to be shared with the VMM 130. Confidential code and/or data of the VM 140 that is to be protected may be present in the secure memory pages 166 (e.g., and not present in the insecure memory pages 168).

The communicating logic 154 may communicate to the processor 112 and the VMM 130 which virtual memory pages are secure memory pages 166 (e.g., communicate a secure or insecure attribute of every virtual memory page). Responsive to receiving the indication of which virtual memory pages are secure memory pages 166, the VMM 130 may create a mapping from the virtual address to the physical address for each of the secure memory pages 166 and store the mappings in the EPT 132. In some embodiments, responsive to receiving an indication that a virtual memory page is a secure memory page 166, the VMM 130 may set an ignore page attribute table (IPAT) field of a corresponding entry in the EPT 132 to zero (e.g., to not ignore the page attributes in the guest page tables 152). Responsive to the VM 140 attempting to access a secure memory page 166, the processor 112 may enforce the attributes for the secure memory page 166 in the guest page table 152 (e.g., enforce the VM's choice of RWX and cache attributes for the page). The processor 112 may ignore the corresponding memory bits of the EPT 132 (including the present bit) for all secure memory pages 166 of the VM. In some embodiments, the processor 112 may enforce that the IPAT bit in the entries of the EPT 132 is set to zero (e.g., reset) for all secure memory pages 166 (e.g., all virtual memory pages that are specified as secure). The processor 112 (e.g., processor core 114) may use the page attribute table (PAT) entries of the guest page tables 152 of VM 140 to determine attributes for secure memory pages 166.

In some embodiments, the VM security logic 158 may prevent the VMM 130 from accessing, modifying, and replaying older versions of secure memory pages 166 of the VM 140. The VM security logic 158 may protect against attacks that involve mapping secure memory pages 166 to other VMs. The VM security logic 158 may prevent the VMM 130 from launching these attacks and/or may detect these attacks responsive to the VMM 130 attempting to tamper with secure memory pages 166 of the VM 140. The VM security logic 158 may prevent the VMM 130 from modifying the mapping in the guest page table 152 (e.g., of a virtual address to a physical address) of security memory pages 166 of a VM 140 without explicit consent of the VM 140. The VM security logic 158 may treat any violation by the EPT 132 (e.g., not setting the IPAT bit to zero for secure memory pages 166) as a security violation. The VM security logic 158 may prevent the VMM from injecting page faults into the VM 140 through manipulation of attribute bits (e.g., RWX, cache attributes) in entries of the EPT 132 at a page granularity. In some embodiments, one or more of the functions described herein as being performed by the VM security logic 158 may be performed by the enforcing logic 116 of the processor 112.

An entry of a page table (e.g., the EPT 132, a guest page table 152) may include a first field to store a mapping from virtual memory pages to physical memory pages (e.g., between virtual addresses and physical addresses) and one or more additional fields to each store a respective page attribute value (e.g., R, W, X, cache attribute, etc.). The enforcing logic 116 of the processor 112 may use the page attribute values in the one or more additional fields to constrain memory accesses. The attributes may include access rights that control how the resulting physical memory page may be accessed. Example access rights include R, W, and X (e.g., read attribute, write attribute, execute attribute), indicating whether software operating in the VM 140 may read, write, or execute from the memory page, respectively.

The guest OS 150 (e.g., via a balloon driver running in the secure memory space 162 of the VM 140) may communicate a set of virtual memory pages that are to be pinned in memory to the VMM 130. The guest OS 150 may begin by demanding pages belonging to the balloon driver to be pinned. The balloon driver may not contain confidential information, so the VMM 130 may not have an incentive or advantage of launching page fault attacks on the balloon driver before the virtual memory pages indicated by the balloon driver are pinned. Responsive to the virtual memory pages being pinned, the guest OS may set a "Present" bit in the entries for the pinned memory pages in the guest page tables 152. At run-time the VMM 130 may reclaim any physical memory page assigned to a VM 140 as long as the entry of the guest page table 152 corresponding to that physical memory page dos not have the "Present" bit set (e.g., VMM 130 may not reclaim pinned memory pages).

The enforcing logic 116 of the processor 112 may enforce that the VMM 130 cannot reclaim any virtual memory pages of the virtual memory 160 that the VM 140 declares to be pinned. The enforcing logic 116 may raise a security exception responsive to encountering a condition in which the "Present" bit is set in the guest page table 152 and the corresponding entry in the EPT 132 does not have the "Read" bit set. The security exception may be handled in a platform-specific manner (e.g., reboot platform to restore platform integrity).

The VMM 130 may maliciously change an entry of the EPT 132 to mark the corresponding physical memory page as unavailable (e.g., "Read" bit=0) despite the guest requesting that the page remains pinned. In one embodiment, this page takes effect after a cache flush and/or translation lookaside buffer (TLB) shoot-down. The next access from the guest OS 150 to this page may result in a violation of the EPT 132 responsive to the processor 112 detecting a mismatch between the "Present" bit in a corresponding entry of the guest page table 152 and the "Read" bit in a corresponding entry of the EPT 132. Similarly, responsive to the guest OS 150 changing the "Present" attribute in an entry of the guest page table 152, the change to the "Present" attribute may only take effect after a cache flush and/or a TLB shoot-down.

In some embodiments, there are rules (e.g., policies stored in physical memory 124) that the guest OS 150 follows to change the "Present" bit. To pin a virtual memory page (that is unpinned), guest OS 150 may create an entry in the guest page table 152 with the "Present" bit set. The guest OS 150 may then use the balloon driver 154 to inform the VMM 130 that the virtual memory page is to be pinned. The VMM 130 then creates a new entry in the EPT 132 corresponding to the entry in the guest page table 152 (if one does not exist) and then sets the "Read" bit in the entry of the EPT 132. The guest OS 150 may then access the newly-pinned memory page. To unpin a pinned memory page, the guest OS 150 may unset the "Present" bit in the corresponding entry of the guest page table 152. The VMM 130 may then reclaim the virtual memory page after forcing a cache flush and/or TLB shoot-down.

The guest OS 150 may select the set of virtual memory pages in the virtual memory 160 that are to remain pinned to prevent the VMM from launching page fault injection attacks that may leak secrets (e.g., sequences of RWX, etc.) used in the sensitive applications.

In some embodiments, responsive to processor 112 (e.g., enforcing logic 116) raising a security exception in the system 100, all activity on the platform may cease (e.g., the processor 112 may cause the VM 140 to cease activity) due to the security exception being indicative of malicious behavior of the VMM 130. The ability to raise a security exception may be exploited by the a VM 140 by, for example, setting the "Present" bit on entries of a guest page table 152 for pages that the VM 140 never requested to be pinned. To prevent this, in some embodiments, responsive to processor 112 raising a security exception in the system, the processor 112 may transmit the security exception to the guest OS 150 (e.g., alert the guest OS 150) and the guest OS 150 may determine the next course of action (e.g., instead of the processor 112 ceasing activity of the platform).

In some embodiments, a guest OS 150 may prevent the VMM 130 from reclaiming memory (e.g., in a pay-as-you-go cloud model where users are to be billed according to their memory usage). In other embodiments, guest OSs 150 do not prevent the VMM from reclaiming memory (e.g., due to the mutual distrust between VMM 130 and VMs in the system 100). The unpinning logic 136 of VMM 130 may force a guest OS 150 of a VM 140 to release pinned memory pages by communicating this to the balloon driver of the VM 140. In response to this communication, a guest OS 150 that is benign may prepare to release (unpin) the memory (e.g., scrubbing it, marking it as unavailable in it's the guest page tables 152, etc.) and communicates such to the VMM 130.

Once the guest OS 150 confirms that the guest OS 150 has prepared the memory for releasing (unpinning), the unpinning logic 136 of VMM 130 may reclaim the memory and reuse it. The unpinning logic 136 of VMM 130 may additionally specify a time interval (e.g., a VMM-specified deadline with a lower time limit and an upper time limit) for releasing the target memory. The enforcing logic 116 of the processor 112 may enforce a VMM-specified deadline on the time available to the guest OS 150 for releasing memory. The upper-limit enforcement prevents a VM 140 that is non-compliant from impeding ability of the VMM 130 to reclaim and oversubscribe memory. The enforcing logic 116 may enforce a lower-limit on the time available to the VM to prepare its memory for unpinning to prevent the VMM 130 from reclaiming memory too quickly (e.g., before the VM 140 has finished preparing the memory). In some embodiments, the VMM 130 may allow a certain fraction of the virtual memory 160 of the VM 140 to be pinned at any point in time to allow the VMM 130 to oversubscribe memory (e.g., for the unpinned fraction of the virtual memory 160).

Figure 2:
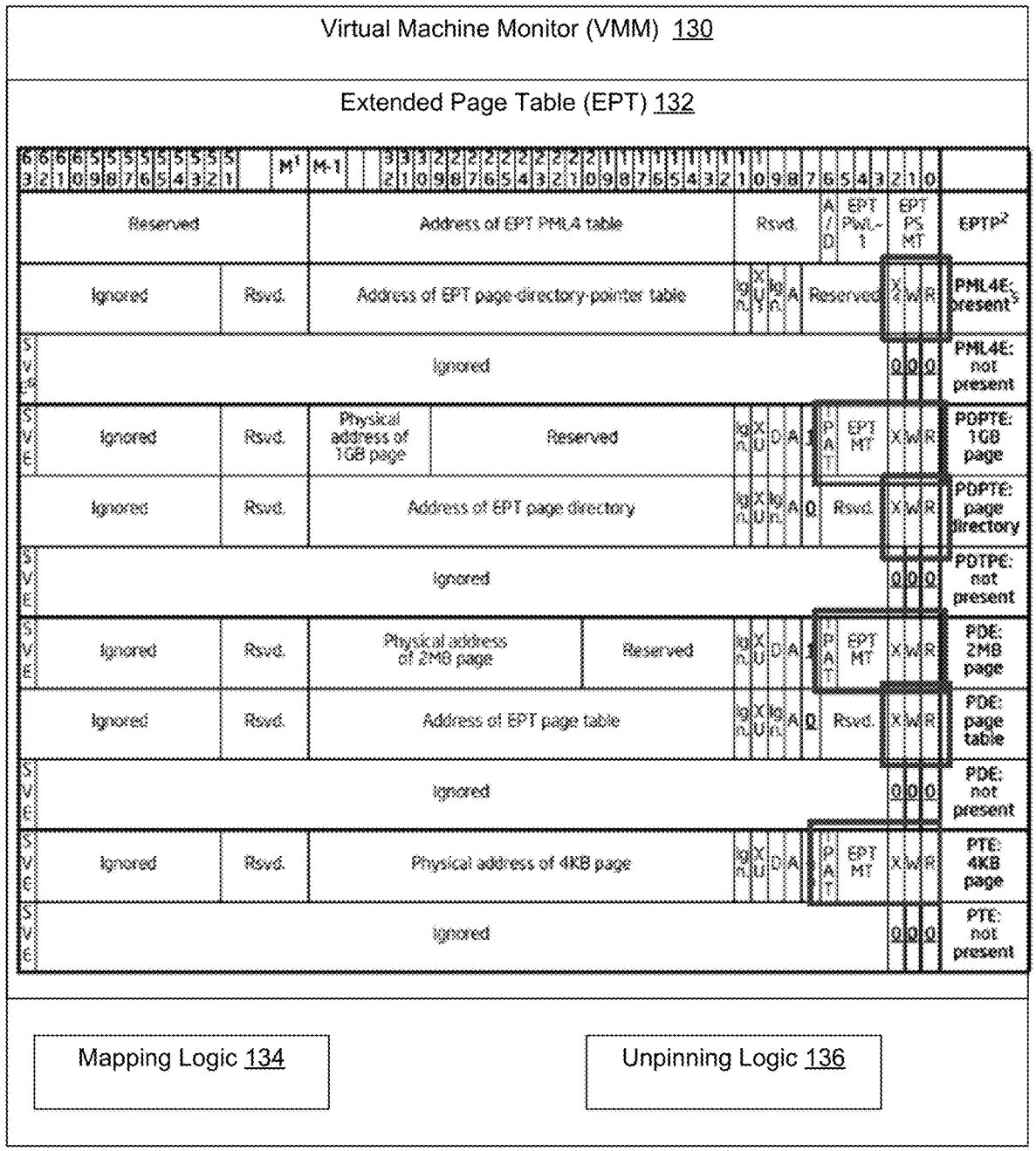
FIG. 2 illustrates a VMM including an extended page table (EPT), according to certain embodiments.

FIG. 2 illustrates the VMM 130 including an EPT 132, according to certain embodiments. VMM 130 may control and populate an EPT 132 that is stored in the physical memory 124. The VMM 130 may also include mapping logic 134 and unpinning logic 136.

The EPT 132 may include entries. Each of one or more of the entries may correspond to a respective physical memory page. For example, as illustrated in FIG. 2, the EPT 132 may include a first entry corresponding to a physical address of a 1 gigabyte (GB) page, second entry corresponding to a physical address of a 2 megabyte (MB) page, and a third entry corresponding to a physical address of a 4 kilobyte (KB) page. Each of the first entry, second entry, and third entry may include respective values in multiple fields. As shown in FIG. 2, the fields may correspond to IPAT, EPT memory type (MT) (e.g., cache attributes), X, W, and R. Responsive to receiving an indication from VM 140 that a virtual memory page is a secure memory page 166, the VMM 130 may set an IPAT field of a corresponding entry in the EPT 132 to zero (e.g., to use first attributes specified by the VM 140 and to ignore second attributes specified by the VMM 130).

The mapping logic 134 of the VMM 130 may create the mappings from virtual memory pages of the virtual memory 160 to physical memory pages of the physical memory 124 and may construct the EPT 132 using the mappings.

Figure 3A:
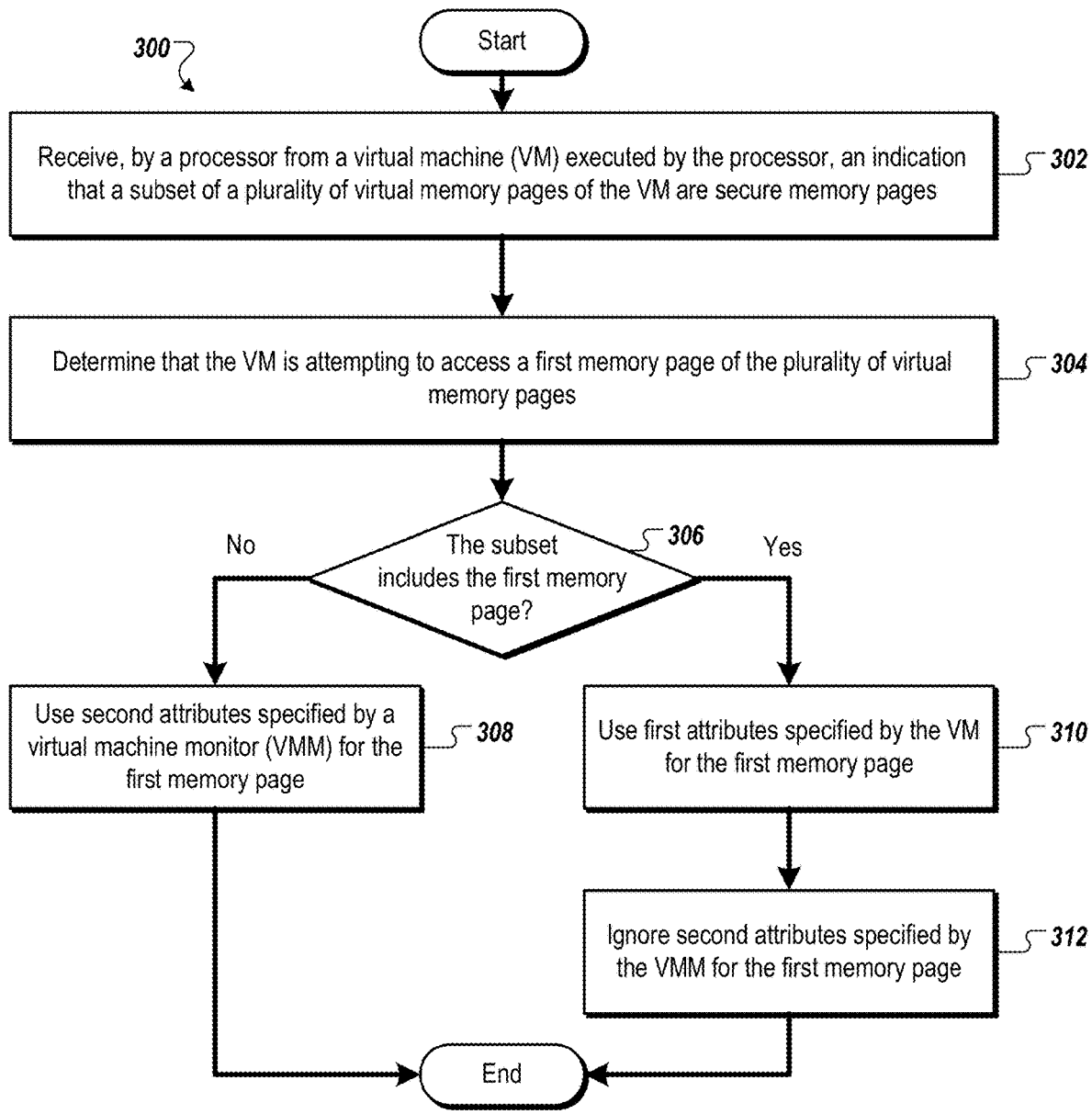
FIGS. 3A-D are flow diagram of methods of splitting control of page attributes between the VM and VMM, according to certain embodiments.
Figure 3B:
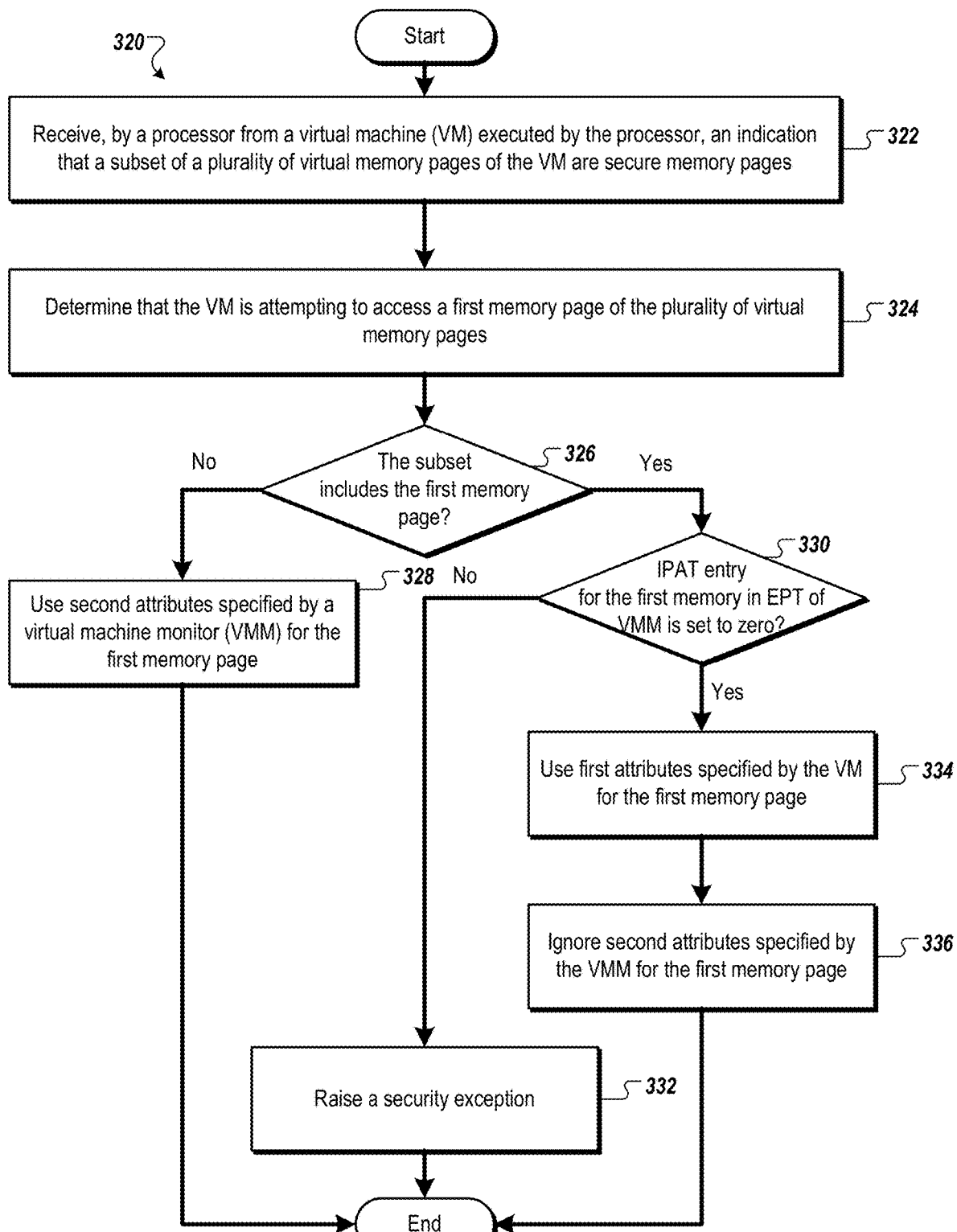
Figure 3C:
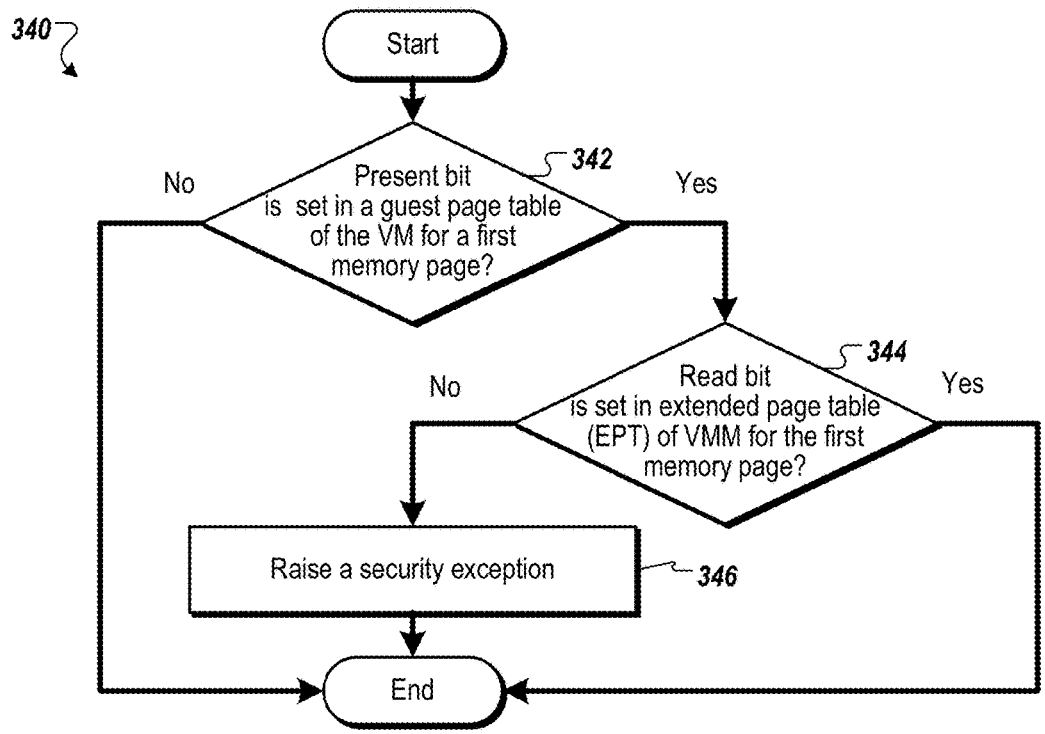
Figure 3D:
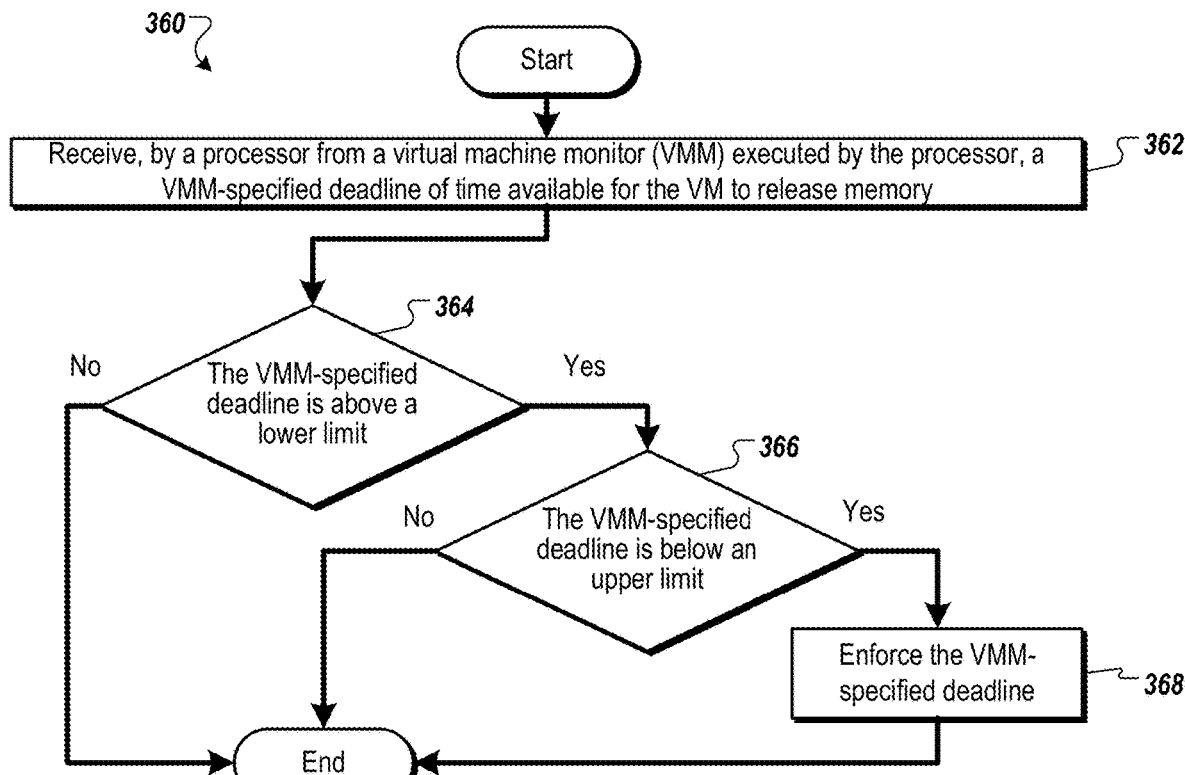

The unpinning logic 136 of the VMM 130 may unpin virtual memory pages (see FIG. 3D).

FIGS. 3A-D are flow diagram of methods 300, 320, 340, and 360 of splitting control of page attributes between the VM 140 and VMM 130, according to certain embodiments. Methods 300, 320, 340, and 360 may be performed by processing logic that is hardware (e.g., circuitry, dedicated logic, programmable logic, microcode, etc.). In one embodiment, methods 300, 320, 340, and 360 may be performed, in part, by processor 112 of FIG. 1. For example, methods 300, 320, 340, and 360 may be performed by logic circuitry of processor 112 including one or more of processor core 114, execution unit 126, enforcing logic 116, memory unit 128, and multi-level page translation logic 118.

For simplicity of explanation, the methods 300, 320, 340, and 360 are depicted and described as acts. However, acts in accordance with this disclosure can occur in various orders and/or concurrently and with other acts not presented and described herein. Furthermore, not all illustrated acts may be performed to implement the methods 300, 320, 340, and 360 in accordance with the disclosed subject matter. In addition, those skilled in the art will understand and appreciate that the methods 300, 320, 340, and 360 could alternatively be represented as interrelated states via a state diagram or events.

Referring to FIG. 3A, at block 302 of method 300, the processing logic (e.g., processor 112) receives, from a VM 140 executed by the processing logic, an indication that a proper subset of a plurality of virtual memory pages of the VM 140 are secure memory pages 166. For example, the communicating logic 154 of the guest OS 150 of the VM 140 may communicate to the processor 112 which of the virtual memory pages of the virtual memory 160 are secure memory pages 166. The processing logic may store an indication of which virtual memory pages are secure memory pages 166 in the physical memory 124.

At block 304, the processing logic determines that the VM 140 is attempting to access a first memory page of the plurality of virtual memory pages in the virtual memory 160 (e.g., corresponding to a physical memory page of the physical memory 124). For example, a software application running on the VM 140 may be attempting to access the first memory page. Although, method 300 refers to processing logic performing acts (e.g., blocks 306-312) responsive to determining that the VM 140 is attempting to access a first memory page in block 304, the processing logic may perform the acts (e.g., blocks 306-312) for every virtual memory page that the VM 140 attempts to access.

At block 306, the processing logic determines whether the proper subset includes the first memory page (e.g., determine whether the first memory page is a secure memory page 166). The processing logic may determine whether the first memory page is a secure memory page 166 based on the indication of secure memory pages 166 received from the VM 140 (e.g., the indication stored in the physical memory 124). Responsive to the proper subset not including the first memory page (e.g., responsive to determining the first memory page is an insecure memory page 168), flow continues to block 308. Responsive to the proper subset including the first memory page (e.g., responsive to determining the first memory page is a secure memory page 166), flow continues to block 310.

At block 308, the processing logic uses second attributes specified by VMM 130 for the first memory page (e.g., in the EPT 132). The processor core 114 may use the second attributes. The enforcing logic 116 may use the second attributes. The enforcing logic 116 may enforce use (e.g., by the processor core 114) of the second attributes. In this embodiment, due to the first memory page being an insecure memory page 168 (e.g., the first memory page is shared between the VMM 130 and the VM 140), the EPT 132 of the VMM 130 may specify the attributes of the first memory page.

At block 310, the processing logic uses first attributes specified by the VM 140 for the first memory page. The processor core 114 may use the first attributes. The enforcing logic 116 may use the first attributes. The enforcing logic 116 may enforce use (e.g., by the processor core 114) of the first attributes. The first attributes may be specified in a corresponding entry of the guest page table 152 of the VM 140.

At block 312, the processing logic ignores second attributes specified by the VMM 130 for the first memory page. In this embodiment, due to the first memory page being a secure memory page (e.g., the first memory page is confidential), the VMM 130 may not access or modify the attributes of the first memory page.

Referring to FIG. 3B, method 320 may split control of page attributes between the VM 140 and VMM 130, according to certain embodiments.

At block 322, the processing logic receives, from a VM 140 executed by the processing logic (e.g., processor 112), an indication that a proper subset of a plurality of virtual memory pages of the VM 140 are secure memory pages 166. Block 322 may be similar to block 302 of FIG. 3A. The VM 140 may transmit an indication of which virtual memory pages are secure memory pages 166 to the VMM 130. Responsive to the VMM 130 receiving the indication of which virtual memory pages are secure memory pages 166, the VMM 130 (e.g., via mapping logic 134) is to set the IPAT entry for the secure memory pages 166 to zero (e.g., to ignore the attributes in the EPT 132 and not ignore the attributes in the guest page tables 152 for the secure memory pages 166).

At block 324, the processing logic determines that the VM 140 is attempting to access a first memory page of the plurality of virtual memory pages in the virtual memory 160. Although, method 320 refers to processing logic performing acts (e.g., blocks 326-336) responsive to determining that the VM 140 is attempting to access a first memory page in block 304, the processing logic may perform the acts (e.g., blocks 326-336) for every virtual memory page that the VM 140 attempts to access. Block 324 may be similar to block 304 of FIG. 3A.

At block 326, the processing logic determines whether the proper subset includes the first memory page (e.g., determine whether the first memory page is a secure memory page 166). Block 326 may be similar to block 306 of FIG. 3A. Responsive to the proper subset not including the first memory page (e.g., responsive to determining the first memory page is an insecure memory page 168), flow continues to block 328. Responsive to the proper subset including the first memory page (e.g., responsive to determining the first memory page is a secure memory page 166), flow continues to block 330.

At block 328, the processing logic uses second attributes specified by VMM 130 for the first memory page (e.g., in the EPT 132). Block 328 may be similar to block 308 of FIG. 3A.

At block 330, the processing logic determines whether the IPAT entry for the first memory page (e.g., whether the IPAT field of the entry corresponding to the first memory page) in the EPT 132 of the VMM 130 is set to zero. Responsive to the IPAT entry not being set to zero (e.g., ignoring the guest page table 152 of the VM 140), flow continues to block 332. Responsive to the IPAT entry being set to zero (e.g., not ignoring the guest page table 152 of the VM 140), flow continues to block 334.

At block 332, the processing logic raises a security exception. For example, the processing logic may cause the VM 140 to cease activity of the VM 140. In another example, the processing logic may indicate to the VM 140 that a security exception has occurred (e.g., alert the VM 140 instead of ceasing activity of the VM 140).

At block 334, the processing logic uses first attributes specified by the VM 140 for the first memory page (e.g., in the guest page table 152). The processing logic may use attributes (e.g., RWX, cache attributes) specified by the guest page tables 152 for each secure memory page 166. Block 334 may be similar to block 310 of FIG. 3A.

At block 336, the processing logic ignores second attributes specified by the VMM 130 for the first memory page. Block 336 may be similar to block 312 of FIG. 3A.

Referring to FIG. 3C, method 340 may split control of page attributes between the VM 140 and VMM 130, according to certain embodiments. Although, method 340 refers to a first memory page, the processing logic may perform method 340 for a plurality of virtual memory pages (e.g., every virtual memory page referenced in the guest page table 152, every virtual memory page in the virtual memory 160, every pinned memory page, etc.).

At block 342, the processing logic determines whether a Present bit is set in a guest page table 152 of a VM 140 for a first memory page (e.g., whether the VM 140 indicated that the first memory page is pinned or is to be pinned). In some embodiments, block 342 may be responsive to the processing logic determining that the VMM 130 is attempting to reclaim the first memory page. In some embodiments, block 342 is responsive to determining that the VM 140 is attempting to access the first memory page. Responsive to the Present bit not being set (e.g., VM 140 indicating the first memory page is not pinned), flow ends. Responsive to the Present bit being set (e.g., VM 140 indicating the first memory page is pinned or is to be pinned), flow continues to block 348.

At block 344, the processing logic determines whether the Read bit is set in the EPT 132 of the VMM 130 for the first memory page (e.g., whether the VMM 130 indicated that the first memory page is pinned or is to be pinned). Responsive to the Read bit not being set (e.g., VMM 130 indicating the first memory page is not pinned), flow continues to block 346. Responsive to the Read bit being set (e.g., VMM 130 indicating the first memory page is pinned), flow ends (e.g., EPT 132 and guest page table 152 match).

At block 346, the processing logic raises a security exception. For example, the enforcing logic 116 may provide an indication to the VM 140 of the security exception. In another example, the enforcing logic 116 may cause the VM 140 to cease activity of the VM 140.

Referring to FIG. 3D, method 360 may split control of page attributes between the VM 140 and VMM 130, according to certain embodiments.

At block 362, the processing logic receives, from a VMM 130 executed by the processing logic (e.g., processor 112), a VMM-specified deadline of time available for the VM 140 to release memory. The VMM 130 may provide the VMM-specified deadline to reclaim (e.g., oversubscribe) memory. For example, the unpinning logic 136 of VMM 130 may transmit an indication of memory pages that are to be unpinned to VM 140 and processor 112. In response to this communication, a guest OS 150 that is benign may prepare to release (unpin) the memory (e.g., scrubbing it, marking it as unavailable in it's the guest page tables 152, etc.) and may communicate that the memory is ready to be released to the VMM 130. Once the guest OS 150 confirms that the guest OS 150 no longer needs the memory to be pinned, the unpinning logic 136 of VMM 130 may reclaim the memory and reuse it. The unpinning logic 136 of VMM 130 may specify a time interval (e.g., VMM-specified deadline with a lower time limit and an upper time limit) for releasing the target memory.

At block 364, the processing logic determines whether the VMM-specified deadline is above a lower limit (e.g., a minimum amount of time for VMM 130 to give notice to VM 140 that the VMM 130 is to reclaim the memory). A policy for the lower limit may be stored in the physical memory 124 to prevent the VMM 130 from reclaiming memory too quickly (e.g., before the VM 140 has finished preparing the memory). Responsive to the VMM-specified deadline not being above the lower limit, flow ends (without enforcing the VMM-specified deadline). Responsive to the VMM-specified deadline being above the lower limit, flow continues to block 366.

At block 366, the processing logic determines whether the VMM-specified deadline is below an upper limit (e.g., a maximum amount of time from the time VMM 130 gave notice to VM 140 that the VMM 130 is to reclaim the memory). The upper-limit enforcement prevents a VM 140 that is non-compliant from impeding ability of the VMM 130 to reclaim and oversubscribe memory. Responsive to the VMM-specified deadline not being below the upper limit, flow ends. Responsive to the VMM-specified deadline being below the upper limit, flow continues to block 368.

At block 368, the processing logic enforces (e.g., via enforcing logic 116) the VMM-specified deadline. The enforcing logic 116 of the processor 112 may enforce the VMM-specified deadline on the time available to the guest OS 150 for releasing memory (e.g., allow the VMM 130 to reclaim memory pages after the VMM-specified deadline passes).

In some embodiments, the processor 112 may store a policy in the physical memory 124 that specifies a fraction of virtual memory 160 of the VM 140 that can be pinned at any point in time to allow the VMM 130 to oversubscribe memory (e.g., for the unpinned fraction of the virtual memory 160). Responsive to receiving a VMM-specified deadline of time available for the VM 140 to release memory for one or more memory pages, the processing logic may determine whether enforcing of the VMM-specified deadline would cause less than the threshold fraction of virtual memory 160 to be pinned. Responsive to determining that enforcing the VMM-specified deadline would not cause less than the fraction of virtual memory 160 of the VM 140 to be pinned, processing logic may enforce the VMM-specified deadline. Responsive to determining that enforcing the VMM-specified deadline would cause less than the fraction of virtual memory 160 of the VM 140 to be pinned, processing logic may not enforce the VMM-specified deadline.

FIG. 4A is a block diagram illustrating a micro-architecture for a processor 400 that splits control of page attributes between the VM 140 and VMM 130, according to one embodiment. Specifically, processor 400 depicts an in-order architecture core and a register renaming logic, out-of-order issue/execution logic to be included in a processor according to at least one embodiment of the disclosure. The embodiments of the enforcing logic 116 and multi-level page translation logic 118 that split control of page attributes between the VM 140 and VMM 130 can be implemented in processor 400. In some embodiments, execution engine unit 450 is execution unit 126 and includes enforcing logic 116 of FIG. 1. In some embodiments, memory unit 470 is memory unit 128 and includes multi-level page translation logic 118 of FIG. 1. In some embodiments, processor 400 is the processor 112 of FIG. 1.

Processor 400 includes a front end unit 430 coupled to an execution engine unit 450, and both are coupled to a memory unit 470. The processor 400 may include a core 490 that is a reduced instruction set computing (RISC) core, a complex instruction set computing (CISC) core, a very long instruction word (VLIW) core, or a hybrid or alternative core type. As yet another option, processor 400 may include a special-purpose core, such as, for example, a network or communication core, compression engine, graphics core, or the like. In another embodiment, the core 490 may have five stages.

The front end unit 430 includes a branch prediction unit 432 coupled to an instruction cache unit 434, which is coupled to an instruction translation lookaside buffer (TLB) unit 436, which is coupled to an instruction fetch unit 438, which is coupled to a decode unit 440. The decode unit 440 (also known as a decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware embodiments, programmable logic arrays (PLAs), microcode read only memories (ROMs), etc. The instruction cache unit 434 is further coupled to the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations (RS), central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which may include TLB unit 472 coupled to a data cache unit (DCU) 474 coupled to a level 2 (L2) cache unit 476. In some embodiments DCU 474 may also be known as a first level data cache (L1 cache). The DCU 474 may handle multiple outstanding cache misses and continue to service incoming stores and loads. It also supports maintaining cache coherency. The TLB unit 472 may be used to improve virtual address translation speed by mapping virtual and physical address spaces. In one exemplary embodiment, the memory access units 464 may include a load unit, a store address unit, and a store data unit, each of which is coupled to the TLB unit 472 in the memory unit 470. The L2 cache unit 476 may be coupled to one or more other levels of cache and eventually to a main memory.

The processor 400 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.

It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

While register renaming is described in the context of out-of-order execution, it should be understood that register renaming may be used in an in-order architecture. While the illustrated embodiment of the processor also includes separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 4B is a block diagram illustrating an in-order pipeline and a register renaming stage, out-of-order issue/execution pipeline implemented by processor 400 of FIG. 4A according to some embodiments of the disclosure. The solid lined boxes in FIG. 4B illustrate an in-order pipeline, while the dashed lined boxes illustrates a register renaming, out-of-order issue/execution pipeline. In FIG. 4B, a processor 400 as a pipeline includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 420, and a commit stage 422. In some embodiments, the ordering of stages 402-422 may be different than illustrated and are not limited to the specific ordering shown in FIG. 7B.

Figure 5:
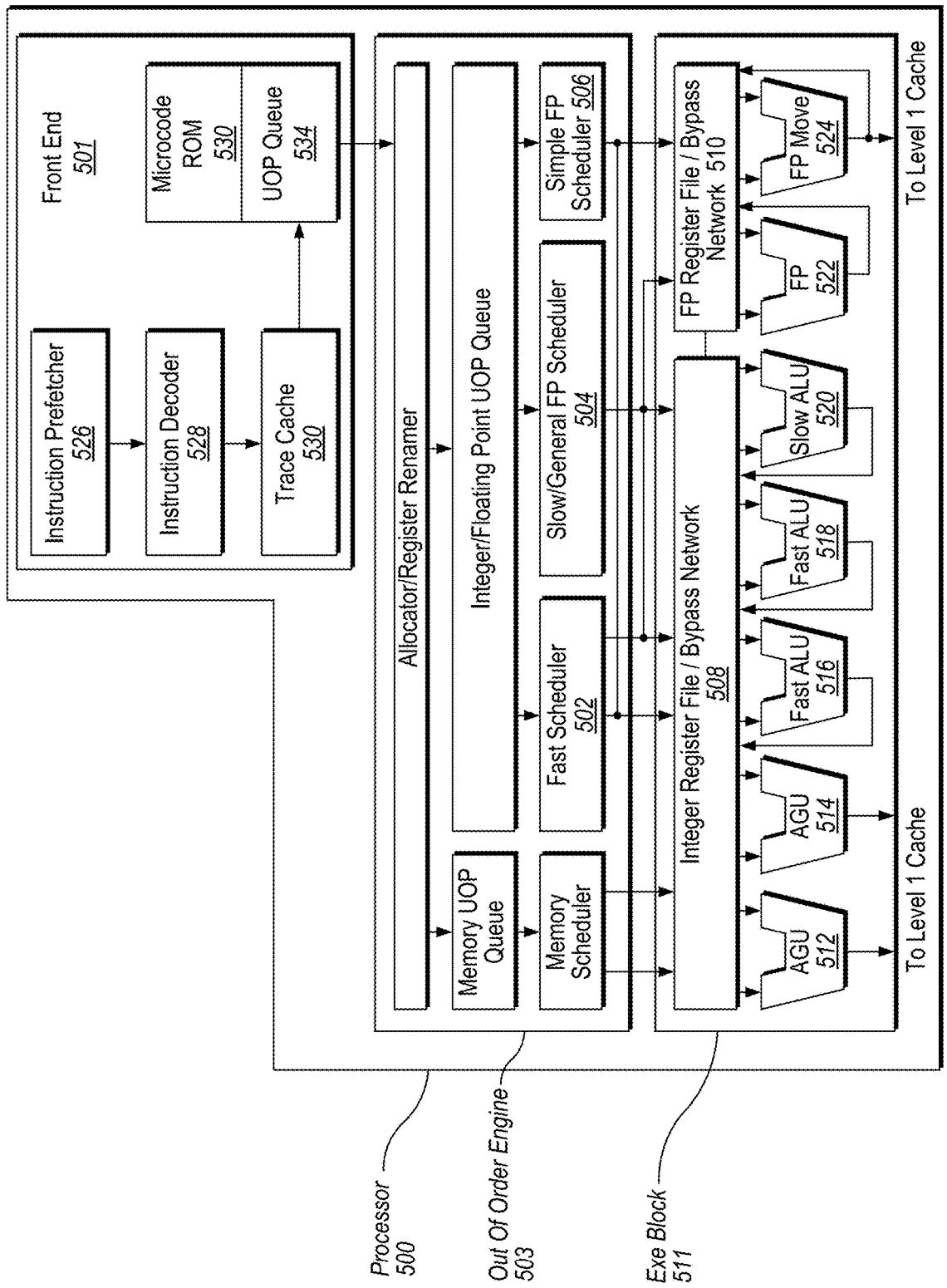
FIG. 5 illustrates a block diagram of the micro-architecture for a processor that splits control of page attributes between the VM and VMM, according to one embodiment.

FIG. 5 illustrates a block diagram of the micro-architecture for a processor 500 that splits control of page attributes between the VM 140 and VMM 130, according to one embodiment. The embodiments of the enforcing logic 116 and multi-level page translation logic 118 that split control of page attributes between the VM 140 and VMM 130 can be implemented in processor 500. In one embodiment, processor 500 is the processor 112 of FIG. 1.

In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 501 is the part of the processor 500 that fetches instructions to be executed and prepares them to be used later in the processor pipeline.

The front end 501 may include several units. In one embodiment, the instruction prefetcher 526 fetches instructions from memory and feeds them to an instruction decoder 528 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others need several micro-ops to complete the full operation. In one embodiment, if more than four micro-ops are needed to complete an instruction, the decoder 528 accesses the microcode ROM 532 to do the instruction. For one embodiment, an instruction can be decoded into a small number of micro ops for processing at the instruction decoder 528. In another embodiment, an instruction can be stored within the microcode ROM 532 should a number of micro-ops be needed to accomplish the operation. The trace cache 530 refers to an entry point programmable logic array (PLA) to determine a correct micro-instruction pointer for reading the micro-code sequences to complete one or more instructions in accordance with one embodiment from the micro-code ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506, determine when a uop is ready to execute based on the readiness of their dependent input register operand sources and the availability of the execution resources the uops need to complete their operation. The fast scheduler 502 of one embodiment can schedule on each half of the main clock cycle while the other schedulers can only schedule once per main processor clock cycle. The schedulers arbitrate for the dispatch ports to schedule uops for execution.

Register files 508, 510, sit between the schedulers 502, 504, 506, and the execution units 512, 514, 516, 518, 520, 522, 524 in the execution block 511. There is a separate register file 508, 510, for integer and floating point operations, respectively. Each register file 508, 510, of one embodiment also includes a bypass network that can bypass or forward just completed results that have not yet been written into the register file to new dependent uops. The integer register file 508 and the floating point register file 510 are also capable of communicating data with the other. For one embodiment, the integer register file 508 is split into two separate register files, one register file for the low order 32 bits of data and a second register file for the high order 32 bits of data. The floating point register file 510 of one embodiment has 128 bit wide entries because floating point instructions typically have operands from 64 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions need to execute. The processor 500 of one embodiment is included of a number of execution units: address generation unit (AGU) 512, AGU 514, fast ALU 516, fast ALU 518, slow ALU 520, floating point ALU 522, floating point move unit 524. For one embodiment, the floating point execution blocks 522, 524, execute floating point, MMX, SIMD, and SSE, or other operations. The floating point ALU 522 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 516, 518. The fast ALUs 516, 518, of one embodiment can execute fast operations with an effective latency of half a clock cycle. For one embodiment, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one embodiment, the integer ALUs 516, 518, 520, are described in the context of performing integer operations on 64 bit data operands. In alternative embodiments, the ALUs 516, 518, 520, can be implemented to support a variety of data bits including 16, 32, 128, 256, etc. Similarly, the floating point units 522, 524, can be implemented to support a range of operands having bits of various widths. For one embodiment, the floating point units 522, 524, can operate on 128 bits wide packed data operands in conjunction with SIMD and multimedia instructions.

In one embodiment, the uops schedulers 502, 504, 506, dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX™ registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 6:
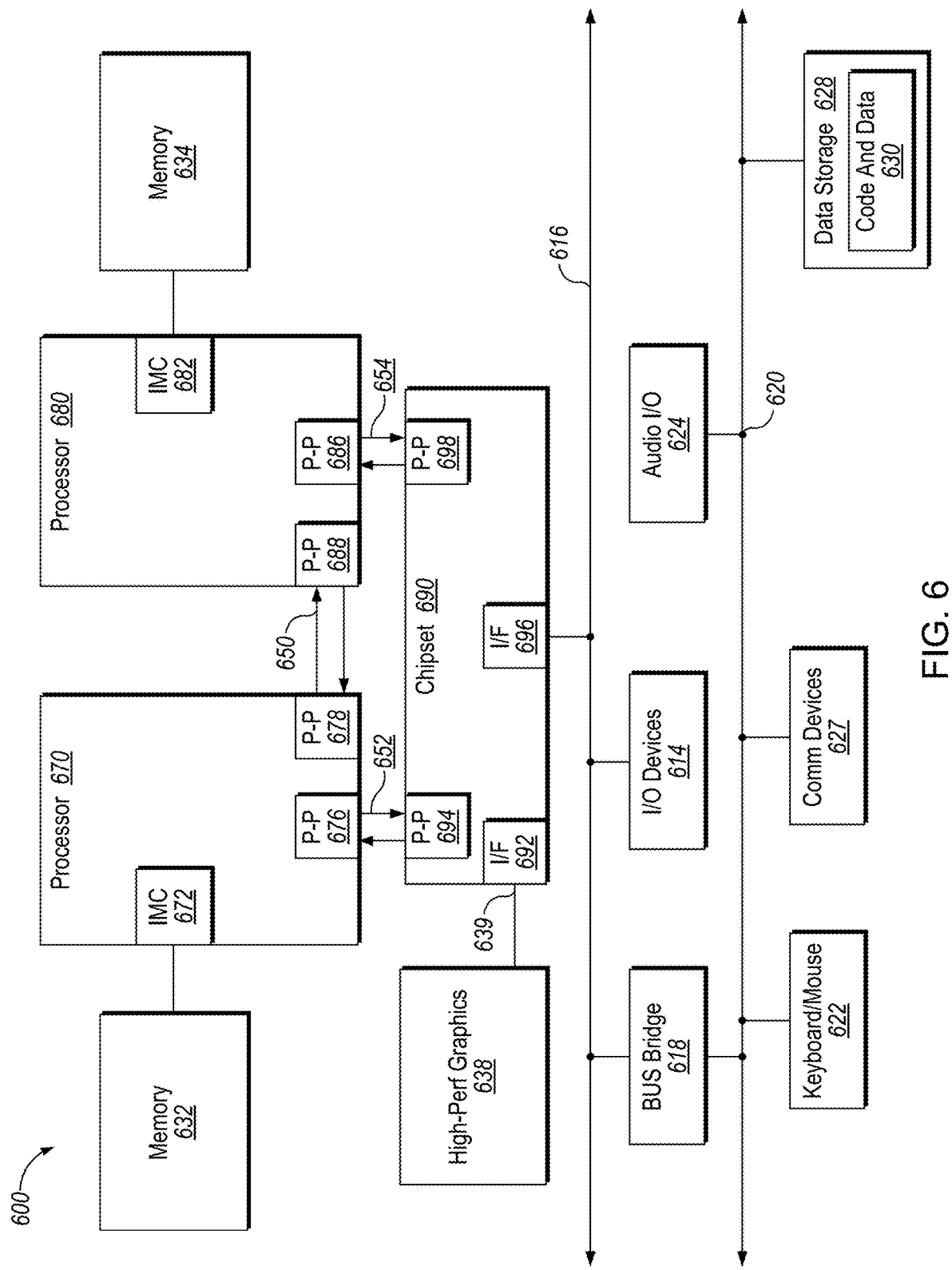
FIG. 6 is a block diagram of a computer system according to one embodiment.

Embodiments may be implemented in many different system types. Referring now to FIG. 6, shown is a block diagram of a multiprocessor system 600 in accordance with an embodiment. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors. The embodiments of the enforcing logic 116 and multi-level page translation logic 118 that split control of page attributes between the VM 140 and VMM 130 can be implemented in processor 670, processor 680, or both. In some embodiments, at least one of processor 670 or processor 680 is the processor 112 of FIG. 1.

While shown with two processors 670, 680, it is to be understood that the scope of the present disclosure is not so limited. In other embodiments, one or more additional processors may be present in a given processor.

Processors 670 and 680 are shown including integrated I/O control logic ("CL") 672 and 682, respectively. Processor 670 also includes as part of its bus controller units point-to-point (P-P) interfaces 676 and 688; similarly, second processor 680 includes P-P interfaces 686 and 688. Processors 670, 680 may exchange information via a point-to-point (P-P) interface 650 using P-P interface circuits 678, 688. As shown in FIG. 6, CL 672 and 682 couple the processors to respective memories, namely a memory 632 and a memory 634, which may be portions of main memory locally attached to the respective processors.

Processors 670, 680 may each exchange information with a chipset 690 via individual P-P interfaces 652, 654 using point to point interface circuits 676, 694, 686, 698. Chipset 690 may also exchange information with a high-performance graphics circuit 638 via a high-performance graphics interface 639.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present disclosure is not so limited.

As shown in FIG. 6, various I/O devices 614 may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard and/or mouse 622, communication devices 627 and a storage unit 628 such as a disk drive or other mass storage device which may include instructions/code and data 630, in one embodiment. Further, an audio I/O 624 may be coupled to second bus 620. Note that other architectures are possible. For example, instead of the point-to-point architecture of FIG. 6, a system may implement a multi-drop bus or other such architecture.

Figure 7:
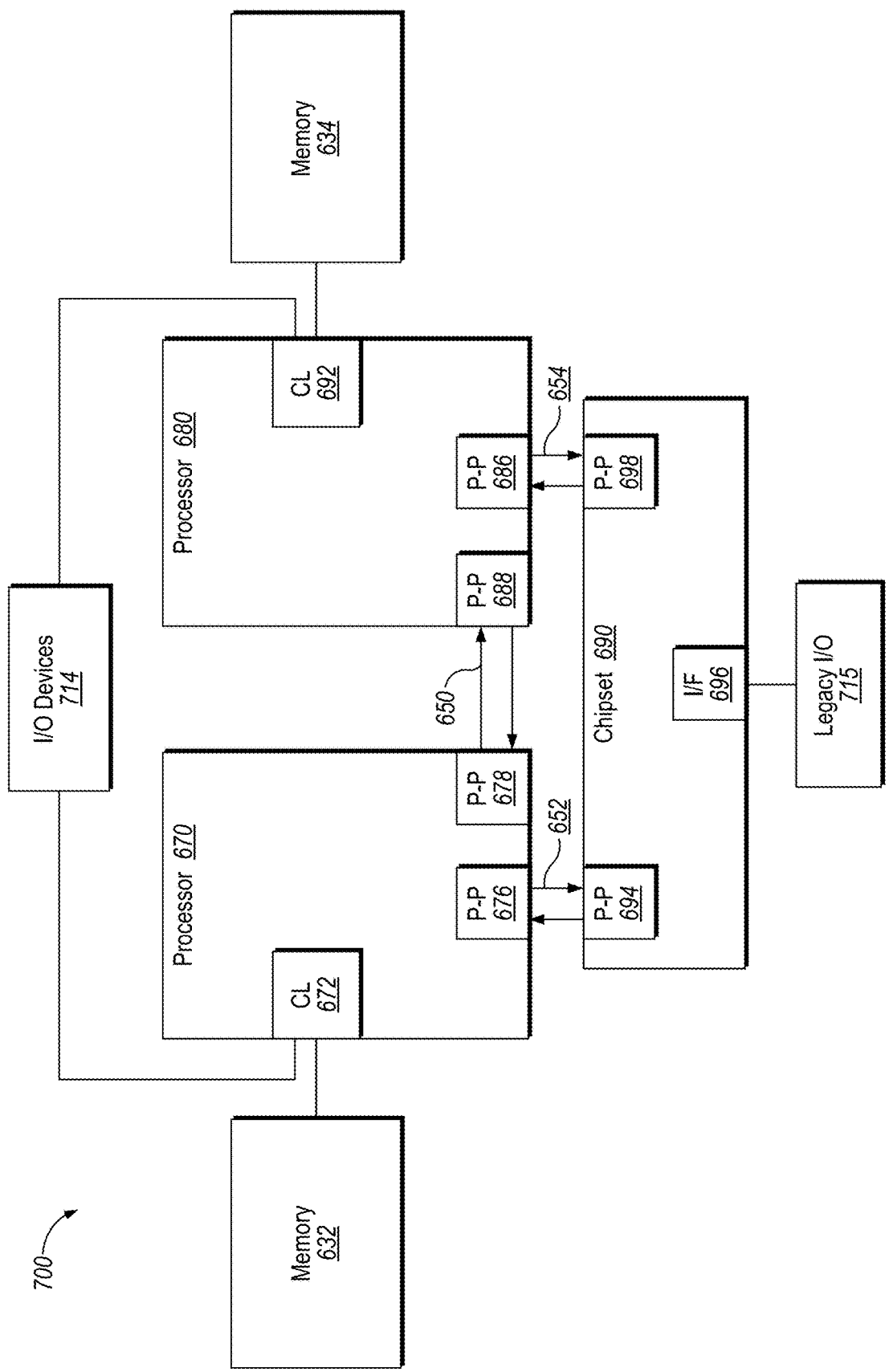
FIG. 7 is a block diagram of a computer system according to another embodiment.

Referring now to FIG. 7, shown is a block diagram of a third system 700 in accordance with an embodiment of the present disclosure. Like elements in FIGS. 6 and 7 bear like reference numerals, and certain aspects of FIG. 6 have been omitted from FIG. 7 in order to avoid obscuring other aspects of FIG. 7.

FIG. 7 illustrates that the processors 670, 680 may include integrated memory and I/O control logic ("CL") 672 and 682, respectively. For at least one embodiment, the CL 672, 682 may include integrated memory controller units such as described herein. In addition, CL 672, 682 may also include I/O control logic. FIG. 7 illustrates that the memories 632, 634 are coupled to the CL 672, 682, and that I/O devices 714 are also coupled to the control logic 672, 682. Legacy I/O devices 715 are coupled to the chipset 690. The embodiments of the enforcing logic 116 and multi-level page translation logic 118 that split control of page attributes between the VM 140 and VMM 130 can be implemented in processor 670, processor 680, or both.

Figure 8:
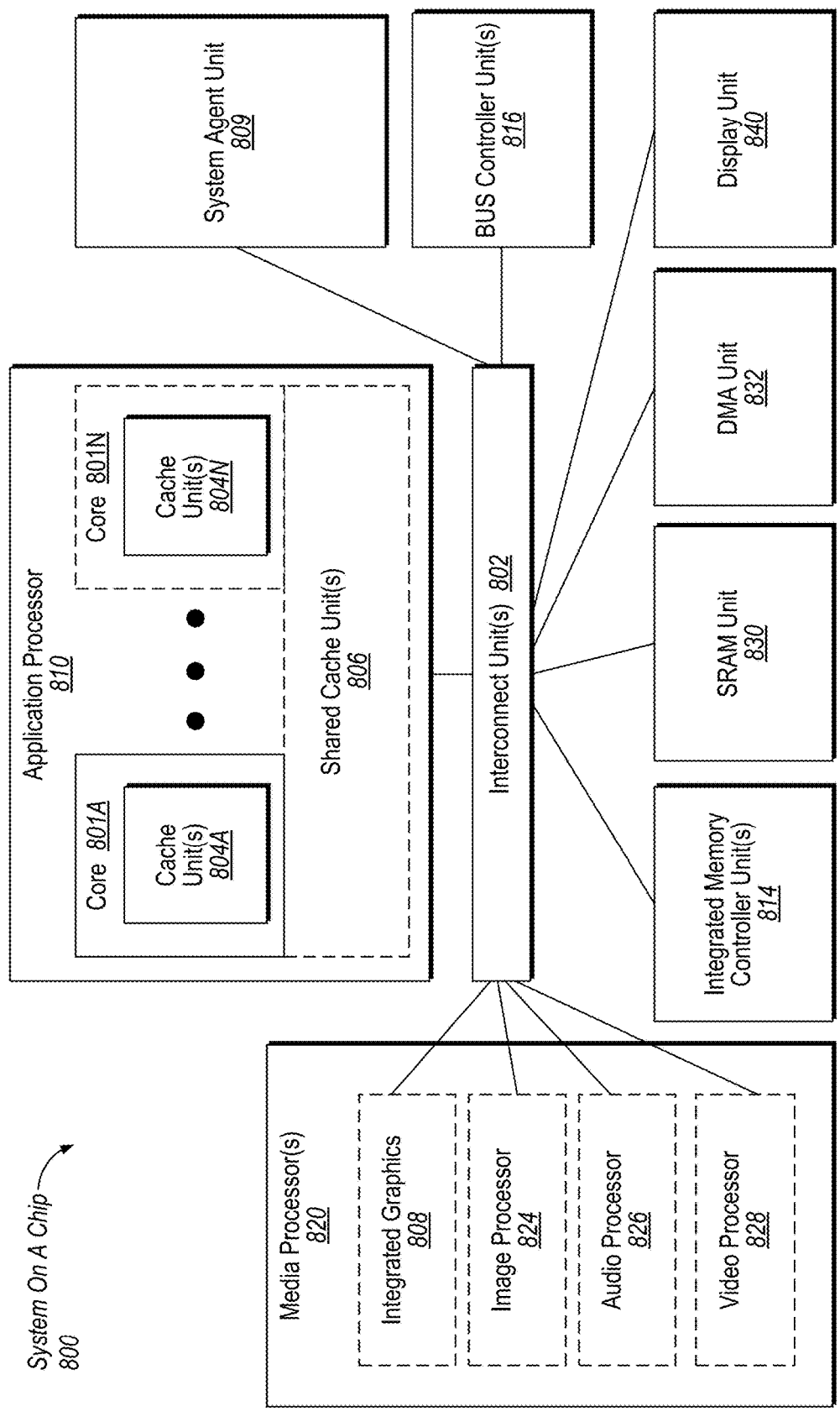
FIG. 8 is a block diagram of a system-on-a-chip according to one embodiment.

FIG. 8 is an exemplary system on a chip (SoC) 800 that may include one or more of the cores 801 (e.g., processor core 114). Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 8, shown is a block diagram of a SoC 800 in accordance with an embodiment of the present disclosure. Also, dashed lined boxes are features on more advanced SoCs. In FIG. 8, an interconnect unit(s) 802 is coupled to: an application processor 810 which includes a set of one or more cores 801A-N and shared cache unit(s) 806; a system agent unit 809; a bus controller unit(s) 816; an integrated memory controller unit(s) 814; a set or one or more media processors 820 which may include integrated graphics logic 808, an image processor 824 for providing still and/or video camera functionality, an audio processor 826 for providing hardware audio acceleration, and a video processor 828 for providing video encode/decode acceleration; a static random access memory (SRAM) unit 830; a direct memory access (DMA) unit 832; and a display unit 840 for coupling to one or more external displays. The embodiments of the enforcing logic 116 and multi-level page translation logic 118 that split control of page attributes between the VM 140 and VMM 130 can be implemented in SoC 800. In one embodiment, processor 112 and physical memory 124 of FIG. 1 are fabricated on SoC 800. The embodiments of the enforcing logic 116 and multi-level page translation logic 118 that split control of page attributes between the VM 140 and VMM 130 may be located in the application processor 810.

Figure 9:
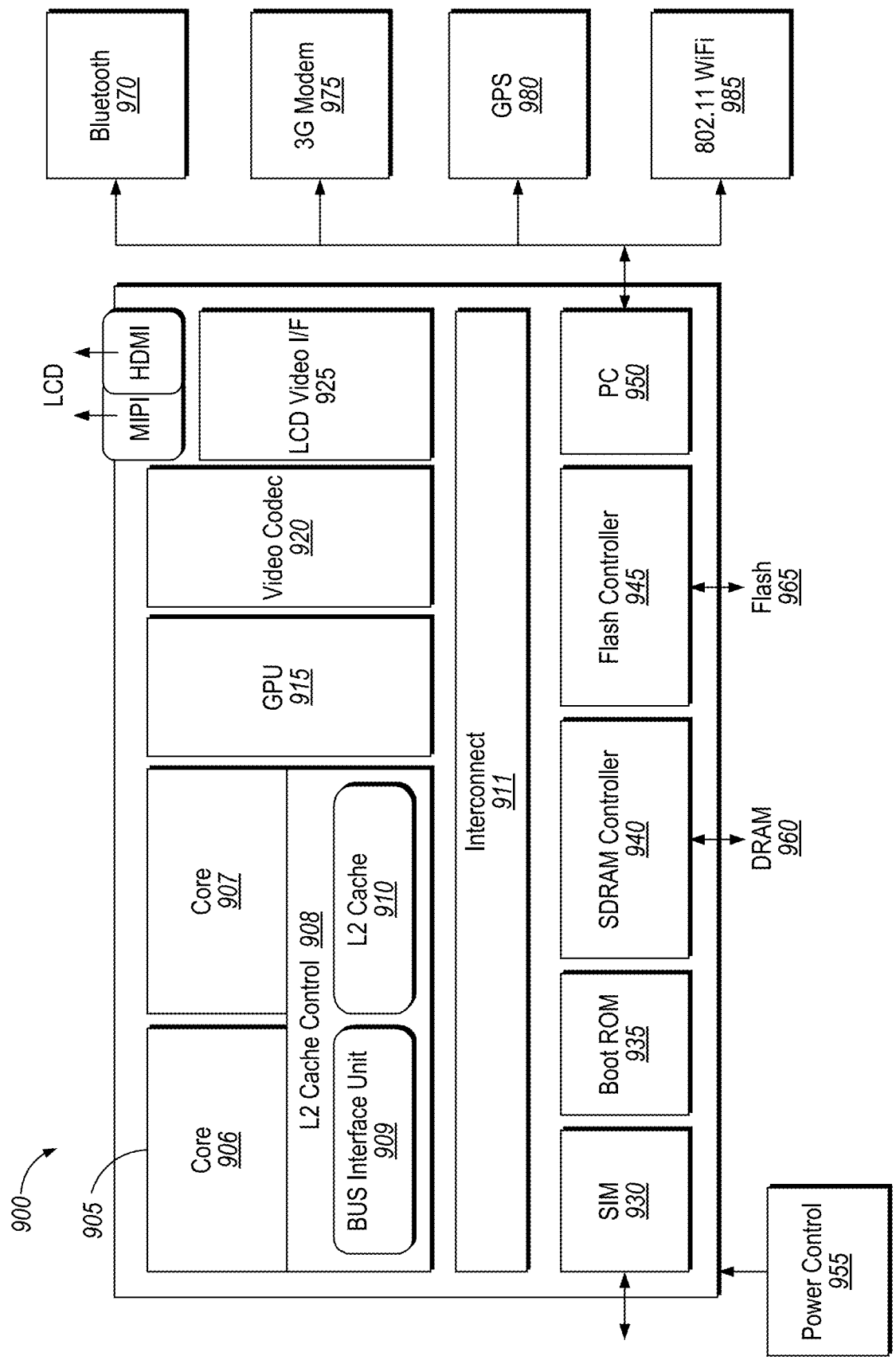
FIG. 9 illustrates another embodiment of a block diagram for a computing system.

Turning next to FIG. 9, an embodiment of a system on-chip (SoC) design in accordance with embodiments of the disclosure is depicted. As an illustrative example, SoC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the enforcing logic 116 and multi-level page translation logic 118 that split control of page attributes between the VM 140 and VMM 130 can be implemented in SoC 900. In one embodiment, processor 112 and physical memory 124 of FIG. 1 are fabricated on SoC 900.

Here, SoC 900 includes 2 cores-906 and 907. Similar to the discussion above, cores 906 and 907 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 911 includes an on-chip interconnect, such as an IOSF, AMBA, or other interconnects discussed above, which can implement one or more aspects of the described disclosure.

Interconnect 911 provides communication channels to the other components, such as a Subscriber Identity Module (SIM) 930 to interface with a SIM card, a boot ROM 935 to hold boot code for execution by cores 906 and 907 to initialize and boot SoC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the embodiments described herein.

In addition, the system illustrates peripherals for communication, such as a Bluetooth module 970, 3G modem 975, GPS 980, and Wi-Fi 985. Note as stated above, a UE includes a radio for communication. As a result, these peripheral communication modules may not all be included. However, in a UE some form of a radio for external communication should be included.

Figure 10:
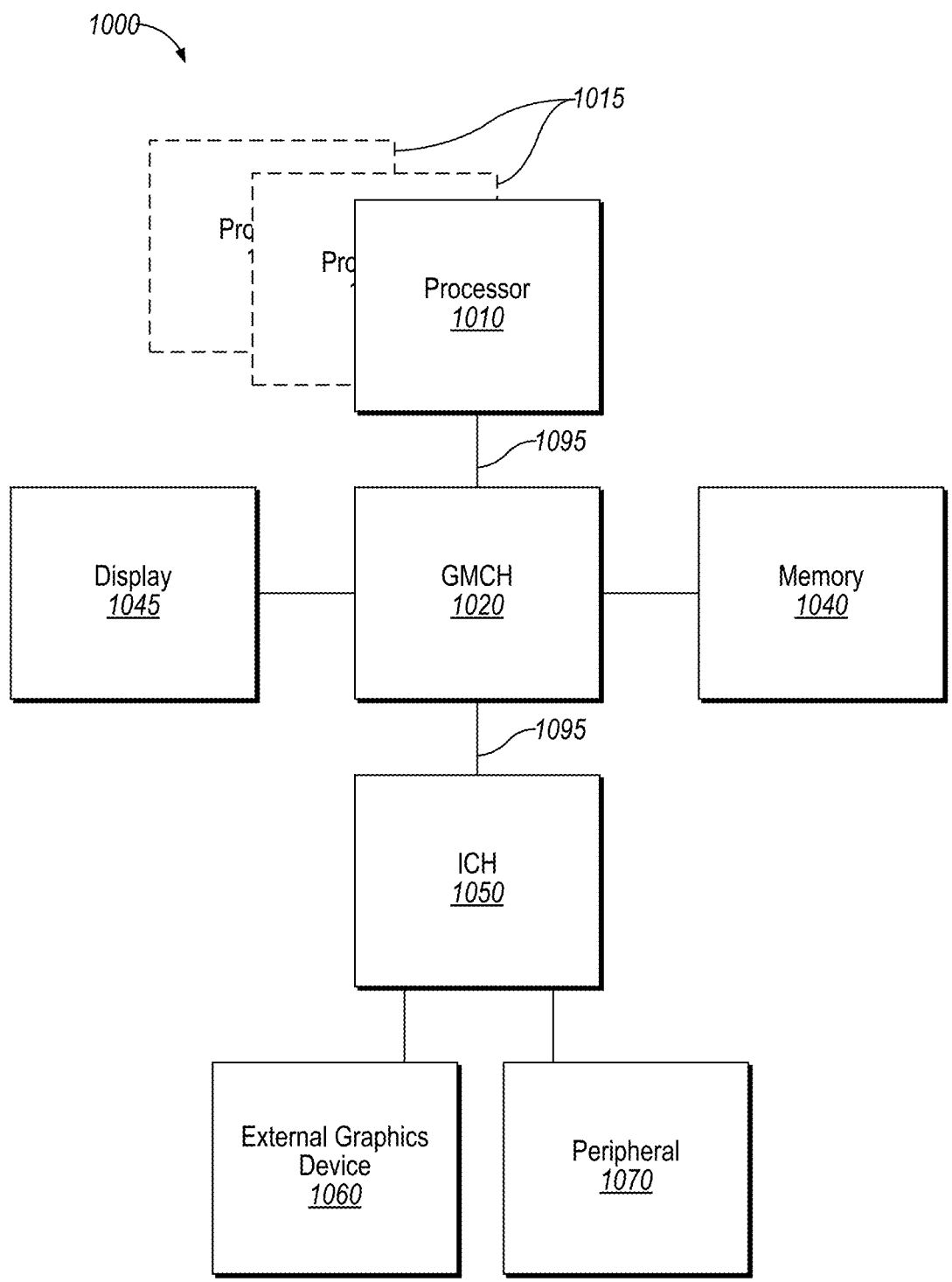
FIG. 10 illustrates a system in which an embodiment of the disclosure may operate.

Referring now to FIG. 10, shown is a block diagram of a system 1000 in which one embodiment of the disclosure may operate. The system 1000 may include one or more processors 1010, 1015, which are coupled to graphics memory controller hub (GMCH) 1020. The optional nature of additional processors 1015 is denoted in FIG. 10 with broken lines. In one embodiment, processors 1010, 1015 implement hybrid cores according to embodiments of the disclosure.

Each processor 1010, 1015 may be some version of the circuit, integrated circuit, processor, and/or silicon integrated circuit as described above. However, it should be noted that it is unlikely that integrated graphics logic and integrated memory control units would exist in the processors 1010, 1015. FIG. 10 illustrates that the GMCH 1020 may be coupled to a memory 1040 that may be, for example, a dynamic random access memory (DRAM). The DRAM may, for at least one embodiment, be associated with a non-volatile cache. In various embodiments, one or more of processors 1010 and 1015 can perform split control of page attributes between virtual machines and a virtual machine monitor as described herein. Additionally, any one of processors 1010 and 1015, in various embodiments, is the same as any one of processing devices 100A-F.

The GMCH 1020 may be a chipset, or a portion of a chipset. The GMCH 1020 may communicate with the processor(s) 1010, 1015 and control interaction between the processor(s) 1010, 1015 and memory 1040. The GMCH 1020 may also act as an accelerated bus interface between the processor(s) 1010, 1015 and other elements of the system 1000. For at least one embodiment, the GMCH 1020 communicates with the processor(s) 1010, 1015 via a multi-drop bus, such as a frontside bus (FSB) 1095.

Furthermore, GMCH 1020 is coupled to a display 1045 (such as a flat panel or touchscreen display). GMCH 1020 may include an integrated graphics accelerator. GMCH 1020 is further coupled to an input/output (I/O) controller hub (ICH) 1050, which may be used to couple various peripheral devices to system 1000. Shown for example in the embodiment of FIG. 10 is an external graphics device 1060, which may be a discrete graphics device, coupled to ICH 1050, along with another peripheral device 1070.

Alternatively, additional or different processors may also be present in the system 1000. For example, additional processor(s) 1015 may include additional processors(s) that are the same as processor 1010, additional processor(s) that are heterogeneous or asymmetric to processor 1010, accelerators (such as, e.g., graphics accelerators or digital signal processing (DSP) units), field programmable gate arrays, or any other processor. There can be a variety of differences between the processor(s) 1010, 1015 in terms of a spectrum of metrics of merit including architectural, micro-architectural, thermal, power consumption characteristics, and the like. These differences may effectively manifest themselves as asymmetry and heterogeneity amongst the processors 1010, 1015. For at least one embodiment, the various processors 1010, 1015 may reside in the same die package.

Figure 11:
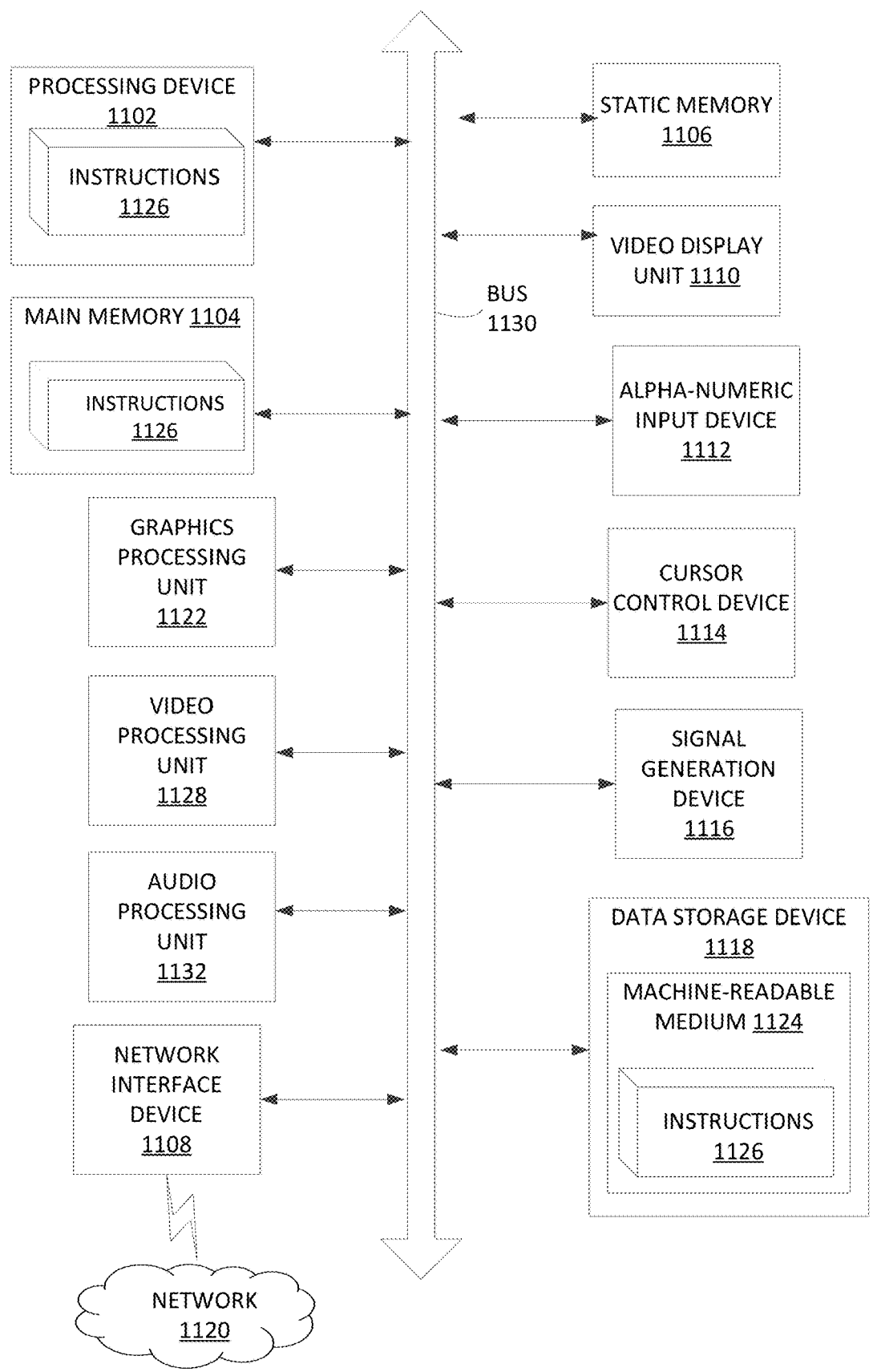
FIG. 11 illustrates another embodiment of a block diagram for a computing system.

FIG. 11 illustrates a diagrammatic representation of a machine in the example form of a computing system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the enforcing logic 116 and multi-level page translation logic 118 that split control of page attributes between the VM 140 and VMM 130 can be implemented in computing system 1100.

The computing system 1100 includes a processing device 1102, main memory 1104 (e.g., read-only memory (ROM), flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. In one embodiment, processing device 1102 may include one or processor cores. The processing device 1102 is configured to execute the instructions 1126 (e.g., processing logic) for performing the operations discussed herein. In one embodiment, processing device 1102 can include the enforcing logic 116 and multi-level page translation logic 118 of FIG. 1. In another embodiment, processing device 1102 is processor 112 of FIG. 1. Alternatively, the computing system 1100 can include other components as described herein. It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

The computing system 1100 may further include a network interface device 1108 communicably coupled to a network 1120. The computing system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a signal generation device 1116 (e.g., a speaker), or other peripheral devices. Furthermore, computing system 1100 may include a graphics processing unit 1122, a video processing unit 1128 and an audio processing unit 1132. In another embodiment, the computing system 1100 may include a chipset (not illustrated), which refers to a group of integrated circuits, or chips, that are designed to work with the processing device 1102 and controls communications between the processing device 1102 and external devices. For example, the chipset may be a set of chips on a motherboard that links the processing device 1102 to very high-speed devices, such as main memory 1104 and graphic controllers, as well as linking the processing device 1102 to lower-speed peripheral buses of peripherals, such as USB, PCI or ISA buses.

The data storage device 1118 may include a computer-readable storage medium 1124 on which is stored instructions 1126 (e.g., software) embodying any one or more of the methodologies of functions described herein. The instructions 1126 (e.g., software) may also reside, completely or at least partially, within the main memory 1104 as instructions 1126 and/or within the processing device 1102 as processing logic during execution thereof by the computing system 1100; the main memory 1104 and the processing device 1102 also constituting computer-readable storage media.

The computer-readable storage medium 1124 may also be used to store instructions 1126 utilizing the processing device 1102 and/or a software library containing methods that call the above applications. While the computer-readable storage medium 1124 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising a memory unit to: store first attributes specified by a virtual machine (VM) for a first memory page, the VM to be executed by the processor; and store second attributes specified by a virtual machine monitor (VMM) for the first memory page, the VMM to be executed by the processor to manage the VM; and an execution unit communicably coupled to the memory unit, the execution unit comprising enforcing logic to: receive, from the VM, an indication that a proper subset of a plurality of virtual memory pages of the VM are secure memory pages; determine whether the VM is attempting to access the first memory page; and responsive to determining the VM is attempting to access the first memory page, determine whether the proper subset comprises the first memory page; and responsive to determining the proper subset comprises the first memory page, enforce use of the first attributes specified by the VM for the first memory page and ignore the second attributes specified by the VMM for the first memory page.

In Example 2, the subject matter of Example 1, wherein responsive to determining that the proper subset does not comprise the first memory page, the enforcing logic is to enforce use the second attributes specified by the VMM for the first memory page.

In Example 3, the subject matter of any one of Examples 1-2, wherein to use the first attributes and ignore the second attributes, the enforcing logic is to: determine whether an ignore page attribute table (IPAT) entry for the first memory page in an extended page table (EPT) of the VMM is set to zero; and responsive to determining that the IPAT entry in the EPT is set to zero, use the first attributes specified by a guest page table of the VM for the first memory page; and responsive to determining that the proper subset comprises the first memory page and that the IPAT entry in the EPT is not set to zero, raise a security exception.

In Example 4, the subject matter of any one of Examples 1-3, wherein the enforcing logic is further to: responsive to determining the VM is attempting to access the first memory page, determine whether a present bit is set in a guest page table of the VM for the first memory page; responsive to determining that the present bit is set, determine whether a read bit is set in an extended page table (EPT) of the VMM for the first memory page; and responsive to determining that the read bit is not set, raise a security exception.

In Example 5, the subject matter of any one of Examples 1-4, wherein the enforcing logic is to: receive a VMM-specified deadline of time available for the VM to release memory; determine that the VMM-specified deadline is at least one of above a lower limit or below an upper limit; and enforce the VMM-specified deadline.

In Example 6, the subject matter of any one of Examples 1-5, wherein: the first attributes comprise a first read attribute, a first write attribute, a first execute attribute, and first cache attributes; and the second attributes comprise a second read attribute, a second write attribute, a second execute attribute, and second cache attributes.

Example 7 is a method comprising: receiving, by a processor from a virtual machine (VM) executed by the processor, an indication that a proper subset of a plurality of virtual memory pages of the VM are secure memory pages; determine whether the VM is attempting to access a first memory page; responsive to determining the VM is attempting to access the first memory page, determining whether the proper subset comprises the first memory page; and responsive to determining the proper subset comprises the first memory page: using first attributes specified by the VM for the first memory page; and ignoring second attributes specified by a virtual machine monitor (VMM) for the first memory page, the VMM executed by the processor to manage the VM.

In Example 8, the subject matter of Example 7 further comprising: responsive to determining that the proper subset does not comprise the first memory page, using the second attributes specified by the VMM for the first memory page.

In Example 9, the subject matter of any one of Examples 7-8, wherein using the first attributes and ignoring the second attributes further comprises: determining whether an ignore page attribute table (IPAT) entry for the first memory page in an extended page table (EPT) of the VMM is set to zero; and responsive to determining that the IPAT entry in the EPT is set to zero, using the first attributes specified by a guest page table of the VM for the first memory page.

In Example 10, the subject matter of any one of Examples 7-9 further comprising: responsive to determining that the proper subset comprises the first memory page and that the IPAT entry in the EPT is not set to zero, raising a security exception.

In Example 11, the subject matter of any one of Examples 7-10 further comprising: responsive to determining the VM is attempting to access the first memory page, determining whether a present bit is set in a guest page table of the VM for the first memory page; responsive to determining that the present bit is set, determining whether a read bit is set in an extended page table (EPT) of the VMM for the first memory page; and responsive to determining that the read bit is not set, raising a security exception.

In Example 12, the subject matter of any one of Examples 7-11 further comprising: receiving a VMM-specified deadline of time available for the VM to release memory; determining that the VMM-specified deadline is at least one of above a lower limit or below an upper limit; and enforcing the VMM-specified deadline.

In Example 13, the subject matter of any one of Examples 7-12, wherein: the first attributes comprise a first read attribute, a first write attribute, a first execute attribute, and first cache attributes; and the second attributes comprise a second read attribute, a second write attribute, a second execute attribute, and second cache attributes.

Example 14 is a system comprising: a memory comprising a plurality of virtual memory pages corresponding to a virtual machine (VM); a processor coupled to the memory to execute the VM and to: receive, from the VM, an indication that a proper subset of the plurality of virtual memory pages of the VM are secure memory pages; determine whether the VM is attempting to access a first memory page; responsive to determining the VM is attempting to access the first memory page, determine whether the proper subset comprises the first memory page; and responsive to determining the proper subset comprises the first memory page: use first attributes specified by the VM for the first memory page; and ignore second attributes specified by a virtual machine monitor (VMM) for the first memory page, the VMM executed by the processor to manage the VM.

In Example 15, the subject matter of Example 14, wherein responsive to determining that the proper subset does not comprise the first memory page, the processor is to use the second attributes specified by the VMM for the first memory page.

In Example 16, the subject matter of any one of Examples 14-15, wherein to use the first attributes and ignore the second attributes, the processor is to: determine whether an ignore page attribute table (IPAT) entry for the first memory page in an extended page table (EPT) of the VMM is set to zero; and responsive to determining that the IPAT entry in the EPT is set to zero, use the first attributes specified by a guest page table of the VM for the first memory page.

In Example 17, the subject matter of any one of Examples 14-16, wherein responsive to determining that the proper subset comprises the first memory page and that the IPAT entry in the EPT is not set to zero, the processor is to raise a security exception.

In Example 18, the subject matter of any one of Examples 14-17, wherein: responsive to determining the VM is attempting to access the first memory page, the processor is to determine whether a present bit is set in a guest page table of the VM for the first memory page; responsive to determining that the present bit is set, the processor is to determine whether a read bit is set in an extended page table (EPT) of the VMM for the first memory page; and responsive to determining that the read bit is not set, the processor is to raise a security exception.

In Example 19, the subject matter of any one of Examples 14-18, wherein the processor is to: receive a VMM-specified deadline of time available for the VM to release memory; determine that the VMM-specified deadline is at least one of above a lower limit or below an upper limit; and enforce the VMM-specified deadline.

In Example 20, the subject matter of any one of Examples 14-19, wherein: the first attributes comprise a first read attribute, a first write attribute, a first execute attribute, and first cache attributes; and the second attributes comprise a second read attribute, a second write attribute, a second execute attribute, and second cache attributes.

Example 21 is an apparatus comprising means to perform a method of any one of Examples 7-13.

Example 22 is at least one machine readable medium comprising a plurality of instructions, when executed, to implement a method or realize an apparatus of any one of Examples 7-13.

Example 23 is an apparatus comprising a processor configured to perform the method of any one of Examples 7-13.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler embodiments, specific expression of algorithms in code, specific power down and gating techniques/logic and other specific operational details of computer system have not been described in detail in order to avoid unnecessarily obscuring the present disclosure.

The embodiments are described with reference to access control in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible embodiments of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0.

Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "storing," "determining," "incrementing," "evicting," "updating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:
receiving, by a processor from a virtual machine (VM) executed by the processor, an indication that a proper subset of a plurality of virtual memory pages of the VM are secure memory pages;
determine whether the VM is attempting to access a first memory page;
responsive to determining the VM is attempting to access the first memory page, determining whether the proper subset comprises the first memory page;
determining whether an ignore page attribute table (IPAT) entry for the first memory page in an extended page table (EPT) of a virtual machine monitor (VMM) is set to zero, the VMM executed by the processor to manage the VM; and
responsive to determining the proper subset comprises the first memory page and that the IPAT entry in the EPT is set to zero, using first attributes specified by the VM for the first memory page and ignoring second attributes specified by the VMM for the first memory page.

2. The method of claim 1 further comprising:
responsive to determining that the proper subset does not comprise the first memory page, using the second attributes specified by the VMM for the first memory page.

3. The method of claim 1, wherein
the first attributes are specified by a guest page table of the VM for the first memory page.

4. The method of claim 1 further comprising:
responsive to determining that the proper subset comprises the first memory page and that the IPAT entry in the EPT is not set to zero, raising a security exception.

5. The method of claim 1 further comprising:
responsive to determining the VM is attempting to access the first memory page, determining whether a present bit is set in a guest page table of the VM for the first memory page;
responsive to determining that the present bit is set, determining whether a read bit is set in the EPT for the first memory page; and
responsive to determining that the read bit is not set, raising a security exception.

6. The method of claim 1 further comprising:
receiving a VMM-specified deadline of time available for the VM to release memory;
determining that the VMM-specified deadline is at least one of above a lower limit or below an upper limit; and
enforcing the VMM-specified deadline.

7. The method of claim 1, wherein:
the first attributes comprise a first read attribute, a first write attribute, a first execute attribute, and first cache attributes; and
the second attributes comprise a second read attribute, a second write attribute, a second execute attribute, and second cache attributes.

8. A system comprising:
a memory comprising a plurality of virtual memory pages corresponding to a virtual machine (VM);
a processor coupled to the memory to execute the VM and to:
receive, from the VM, an indication that a proper subset of the plurality of virtual memory pages of the VM are secure memory pages;
determine whether the VM is attempting to access a first memory page; and
responsive to determining the VM is attempting to access the first memory page, determine whether the proper subset comprises the first memory page;
determine whether an ignore page attribute table (IPAT) entry for the first memory page in an extended page table (EPT) of a virtual machine monitor (VMM) is set to zero, the VMM executed by the processor to manage the VM; and
responsive to determining the proper subset comprises the first memory page and that the IPAT entry in the EPT is set to zero, use first attributes specified by the VM for the first memory page and ignore second attributes specified by the VMM for the first memory page.

9. The system of claim 8, wherein responsive to determining that the proper subset does not comprise the first memory page, the processor is to use the second attributes specified by the VMM for the first memory page.

10. The system of claim 8, wherein
the first attributes are specified by a guest page table of the VM for the first memory page.

11. The system of claim 8, wherein responsive to determining that the proper subset comprises the first memory page and that the IPAT entry in the EPT is not set to zero, the processor is to raise a security exception.

12. The system of claim 8, wherein:
responsive to determining the VM is attempting to access the first memory page, the processor is to determine whether a present bit is set in a guest page table of the VM for the first memory page;
responsive to determining that the present bit is set, the processor is to determine whether a read bit is set in the EPT for the first memory page; and
responsive to determining that the read bit is not set, the processor is to raise a security exception.

13. The system of claim 8, wherein the processor is to:
receive a VMM-specified deadline of time available for the VM to release memory;

determine that the VMM-specified deadline is at least one of above a lower limit or below an upper limit; and enforce the VMM-specified deadline.

14. The system of claim 8, wherein:

the first attributes comprise a first read attribute, a first write attribute, a first execute attribute, and first cache attributes; and the second attributes comprise a second read attribute, a second write attribute, a second execute attribute, and second cache attributes.

15. A processor comprising:

a memory unit to:

store first attributes specified by a virtual machine (VM) for a first memory page, the VM to be executed by the processor; and store second attributes specified by a virtual machine monitor (VMM) for the first memory page, the VMM to be executed by the processor to manage the VM; and an execution unit communicably coupled to the memory unit, the execution unit comprising enforcing logic to:

receive, from the VM, an indication that a proper subset of a plurality of virtual memory pages of the VM are secure memory pages;

determine whether the VM is attempting to access the first memory page; and responsive to determining the VM is attempting to access the first memory page, determine whether the proper subset comprises the first memory page;

determine whether an ignore page attribute table (IPAT) entry for the first memory page in an extended page table (EPT) of the VMM is set to zero; and responsive to determining the proper subset comprises the first memory page and that the IPAT entry in the EPT is set to zero, enforce use of the first attributes specified by the VM for the first memory page and ignore the second attributes specified by the VMM for the first memory page.

16. The processor of claim 15, wherein responsive to determining that the proper subset does not comprise the first memory page, the enforcing logic is to enforce use the second attributes specified by the VMM for the first memory page.

17. The processor of claim 15, wherein, the enforcing logic is further to:

responsive to determining that the proper subset comprises the first memory page and that the IPAT entry in the EPT is not set to zero, raise a security exception.

18. The processor of claim 15, wherein the enforcing logic is further to:

responsive to determining the VM is attempting to access the first memory page, determine whether a present bit is set in a guest page table of the VM for the first memory page;

responsive to determining that the present bit is set, determine whether a read bit is set in the EPT for the first memory page; and responsive to determining that the read bit is not set, raise a security exception.

19. The processor of claim 15, wherein the enforcing logic is to:

receive a VMM-specified deadline of time available for the VM to release memory;

determine that the VMM-specified deadline is at least one of above a lower limit or below an upper limit; and enforce the VMM-specified deadline.

20. The processor of claim 15, wherein:

the first attributes comprise a first read attribute, a first write attribute, a first execute attribute, and first cache attributes; and the second attributes comprise a second read attribute, a second write attribute, a second execute attribute, and second cache attributes.

* * * * *